(12) United States Patent
Ishida et al.

(10) Patent No.: US 7,692,814 B2
(45) Date of Patent: Apr. 6, 2010

(54) IMAGE FORMING APPARATUS

(75) Inventors: Hideki Ishida, Osaka (JP); Shingo Yoshida, Osaka (JP); Hirohito Kondoh, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 1015 days.

(21) Appl. No.: 11/320,436

(22) Filed: Dec. 28, 2005

(65) Prior Publication Data

US 2006/0268342 A1  Nov. 30, 2006

(30) Foreign Application Priority Data

| Dec. 28, 2004 | (JP) | ............................. 2004-378378 |
| Jan. 17, 2005 | (JP) | ............................. 2005-009058 |
| Jan. 26, 2005 | (JP) | ............................. 2005-018915 |
| Jan. 28, 2005 | (JP) | ............................. 2005-022127 |

(51) Int. Cl.
*G06F 15/00* (2006.01)
*G06K 1/00* (2006.01)

(52) U.S. Cl. .................... 358/1.7; 358/1.6; 358/3.01

(58) Field of Classification Search ............... 358/3.01, 358/3.02, 3.26, 1.12, 1.5, 1.6, 1.7, 1.9, 305, 358/406, 448; 348/207.2, 207.99; 347/131, 347/132, 133; 399/1, 3, 4, 128, 129, 159, 399/161, 166, 167, 181
See application file for complete search history.

(56) References Cited

U.S. PATENT DOCUMENTS

| 5,206,686 | A | * | 4/1993 | Fukui et al. ..................... 399/1 |
| 6,226,019 | B1 | * | 5/2001 | Nakano ....................... 347/131 |
| 7,095,433 | B1 | * | 8/2006 | Touma et al. ............. 348/207.2 |
| 2002/0027591 | A1 | | 3/2002 | Itoh |
| 2002/0063936 | A1 | | 5/2002 | Mituhashi |

FOREIGN PATENT DOCUMENTS

| JP | 63-049779 | 3/1988 |
| JP | 1998-31332 | 2/1998 |
| JP | 11-265098 | 9/1999 |
| JP | 2000-162834 | 6/2000 |
| JP | 2003-154706 | 5/2003 |
| JP | 2004-61860 | 2/2004 |
| JP | 2004-233694 | 8/2004 |

\* cited by examiner

*Primary Examiner*—James A Thompson
(74) *Attorney, Agent, or Firm*—Jordan and Hamburg LLP

(57) ABSTRACT

Disclosed is the prevention of the occurrence of uneven image density, as well as the image degradation caused by inhibiting the continuity of image density, produced by the photoreceptor in which uneven electrification exists, and additionally uneven sensitivity coexists, without enlargement of the apparatus as well as increase in the cost. To the exposure amount obtained by the approximate linear transformation of the pixel gradation in each segment multi-divided in the surface of the photoreceptor drum 1, in all the pixel gradation including 0 level, exposing source 2 is controlled to expose with the amount of exposure, offset with only the offset exposure amount Ea which corresponds to the difference between the initial electric potential and the reference initial electric potential V0 of the segment. The exposure amount adjustment of the offset exposure amount Ea is conducted by offsetting the exposure time in each pixel.

18 Claims, 21 Drawing Sheets

Fig. 3
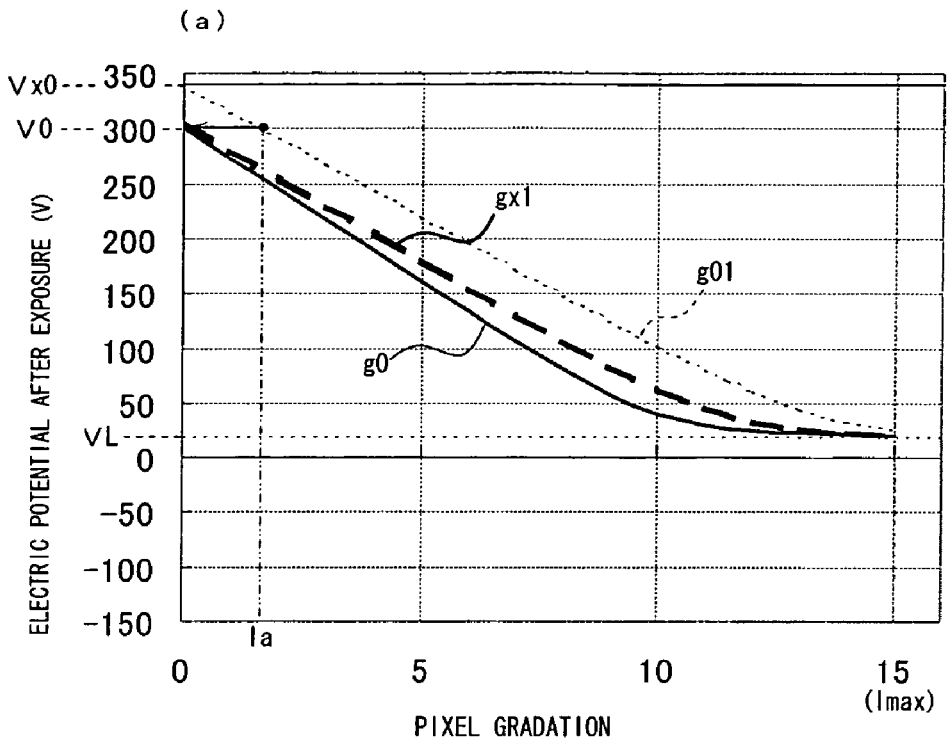
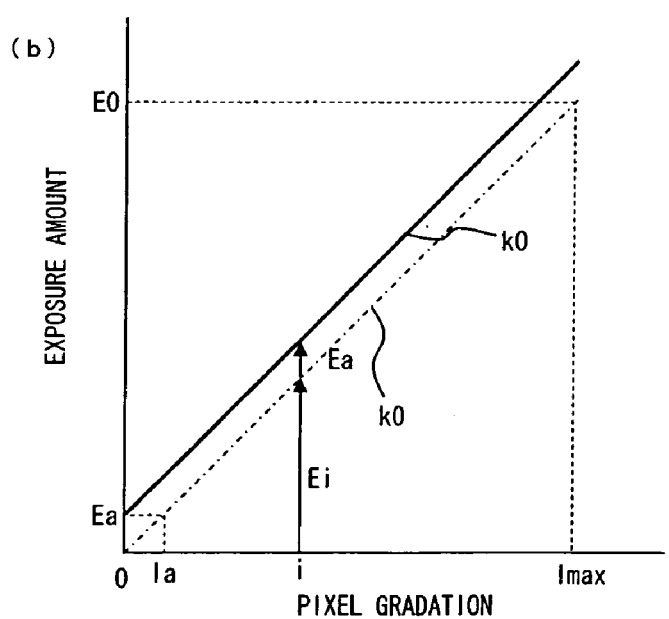

Fig. 4
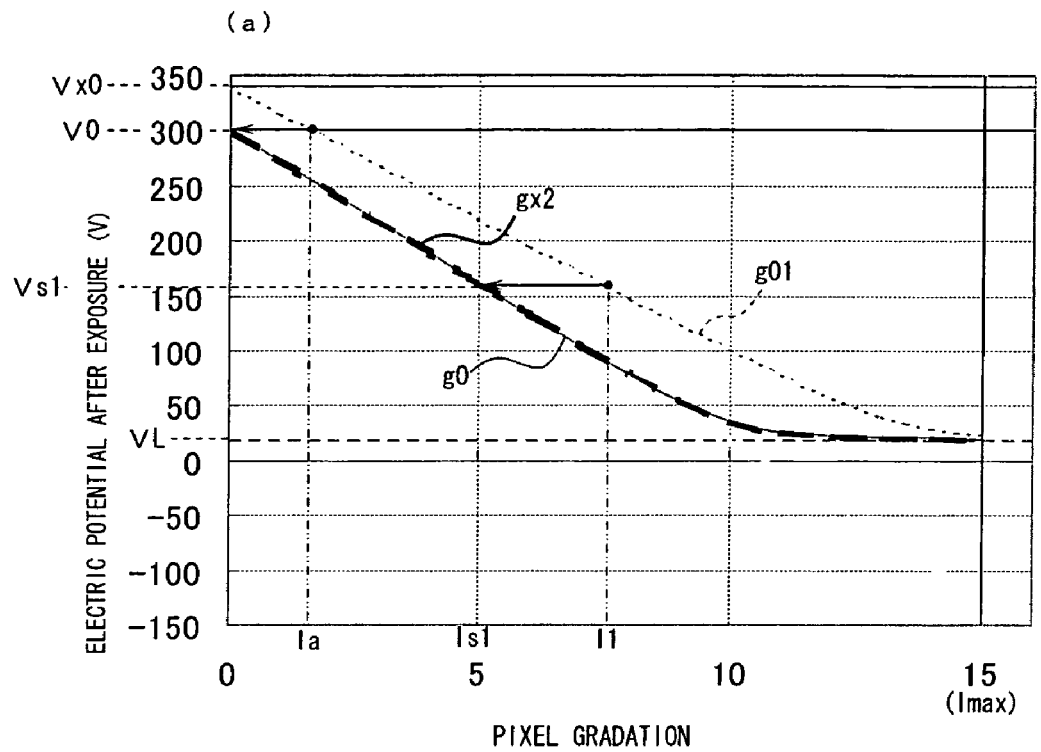
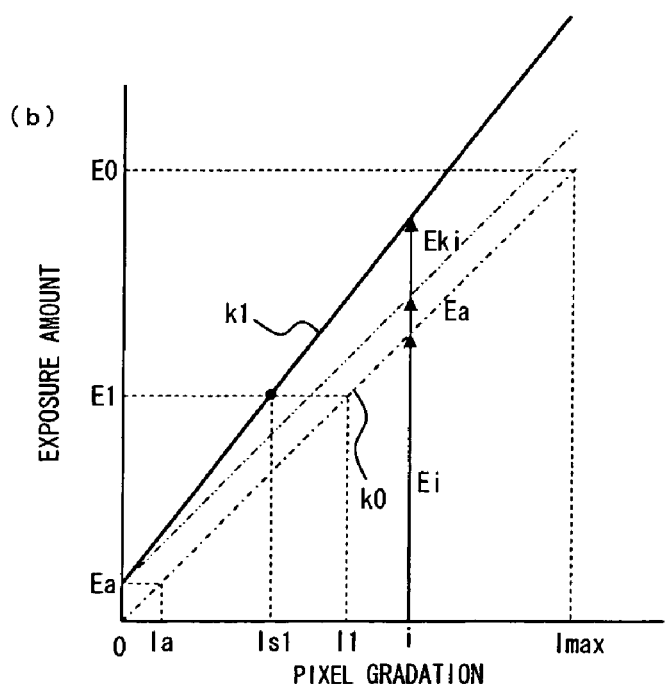

<EXPLANATORY NOTE>
- Ⓔ: PIXEL GRADATION REFERENCE SIGNAL
- Ⓕ: COUNT NUMBER SIGNAL
  (EACH PIXEL)
- Ⓖ: CORRECTIVE GRADATION
- Ⓖ-1: +9 CLOCK
- Ⓖ-2: +9 CLOCK
- Ⓖ-3: +9 CLOCK
- Ⓖ-4: +9 CLOCK
- Ⓖ-5: +9 CLOCK
- Ⓗ: PIXEL GRADATION
- Ⓗ-1: 0 GRADATION
- Ⓗ-2: 1 GRADATION
- Ⓗ-3: 2 GRADATION
- Ⓗ-4: 3 GRADATION
- Ⓗ-5: 15 GRADATION

Fig. 18
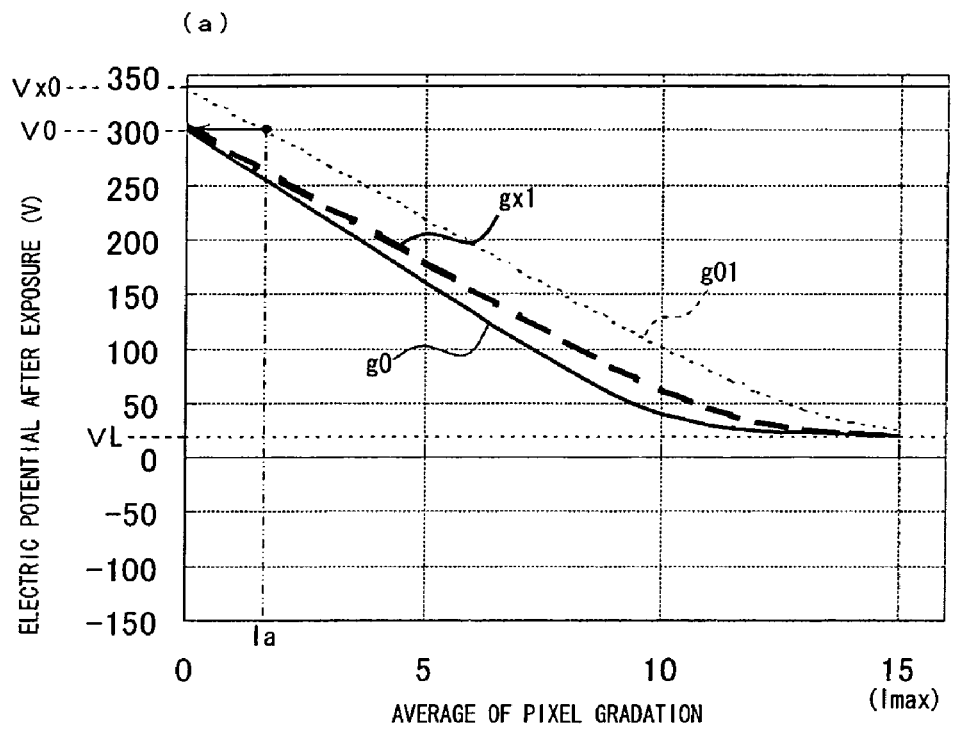
(a)
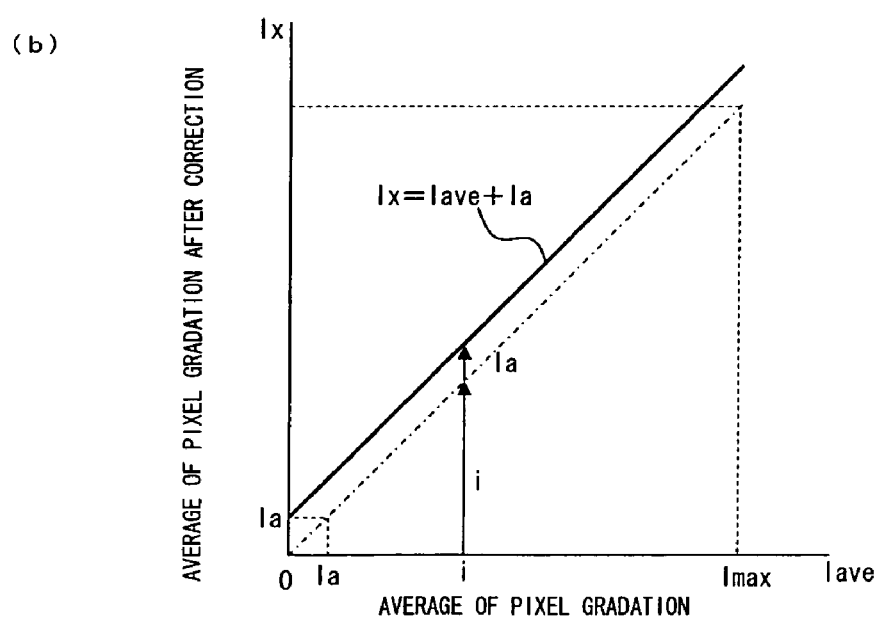
(b)

Fig. 19
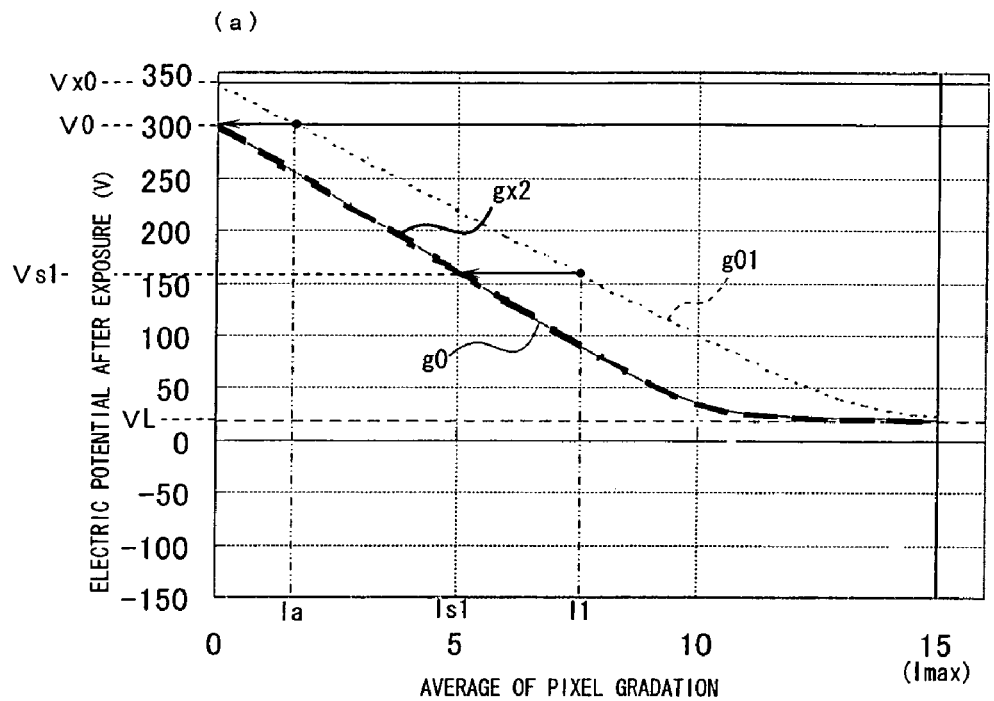
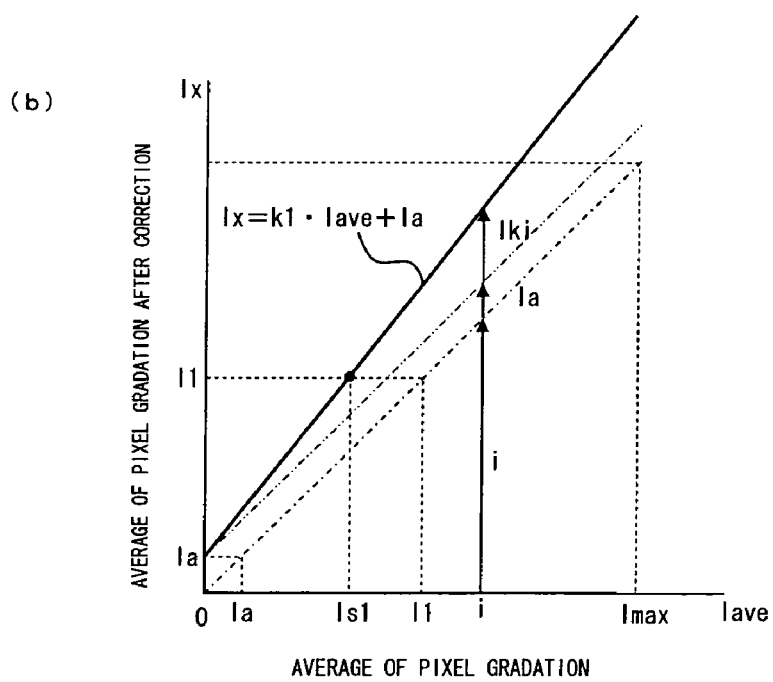

Fig. 24

(a) ARRAY OF PIXELS ACCORDING TO IMAGE DATA BY SCREEN METHOD

| | | | | | | | | | |
|---|---|---|---|---|---|---|---|---|---|
| 0 | 0 | 0 | 0 | 0 | 15 | 15 | 0 | 15 | 15 |
| 0 | 15 | 15 | 0 | 0 | 0 | 0 | 0 | 15 | 15 |
| 0 | 15 | 15 | 0 | 15 | 15 | 0 | 0 | 0 | 0 |
| 0 | 0 | 0 | 0 | 15 | 15 | 0 | 15 | 15 | 0 |
| 15 | 15 | 0 | 0 | 0 | 0 | 0 | 15 | 15 | 0 |
| 15 | 15 | 0 | 15 | 15 | 0 | 0 | 0 | 0 | 0 |
| 0 | 0 | 0 | 15 | 15 | 0 | 15 | 15 | 0 | 0 |
| 15 | 0 | 0 | 0 | 0 | 0 | 15 | 15 | 0 | 15 |
| 15 | 0 | 15 | 15 | 0 | 0 | 0 | 0 | 0 | 15 |
| 0 | 0 | 15 | 15 | 0 | 15 | 15 | 0 | 0 | 0 |

↓ SUB SCANNING DIRECTION  →  MAIN SCANNING DIRECTION

SEGMENT

THE NUMBER OF ALL PIXELS          100 PIXELS
THE NUMBER OF 0 GRADATION PIXELS   60 PIXELS
THE NUMBER OF 15 GRADATION PIXELS  40 PIXELS

AVERAGE OF PIXEL GRADATION         6 GRADATION (b) ARRAY OF THE CORRECTION TARGET PIXEL BY SCREEN METHOD

| | | | | | | | | | |
|---|---|---|---|---|---|---|---|---|---|
| 3 | 3 | 2 | 3 | 3 | 2 | 2 | 2 | 2 | 2 |
| 3 | 3 | 2 | 2 | 2 | 2 | 2 | 3 | 3 | 2 |
| 2 | 2 | 2 | 2 | 3 | 3 | 2 | 3 | 3 | 2 |
| 2 | 3 | 3 | 2 | 3 | 3 | 2 | 2 | 2 | 2 |
| 2 | 2 | 3 | 2 | 2 | 2 | 2 | 2 | 3 | 3 |
| 2 | 2 | 2 | 2 | 2 | 3 | 3 | 2 | 3 | 3 |
| 2 | 2 | 3 | 3 | 2 | 3 | 3 | 2 | 2 | 2 |
| 3 | 2 | 3 | 3 | 2 | 2 | 2 | 2 | 2 | 3 |
| 3 | 2 | 2 | 2 | 2 | 2 | 3 | 3 | 2 | 3 |
| 2 | 2 | 2 | 3 | 3 | 2 | 3 | 3 | 2 | 2 |

↓ SUB SCANNING DIRECTION  →  MAIN SCANNING DIRECTION

SEGMENT

THE NUMBER OF ALL PIXELS          100 PIXELS
THE NUMBER OF 2 GRADATION PIXELS   60 PIXELS
THE NUMBER OF 3 GRADATION PIXELS   40 PIXELS

AVERAGE OF CORRECTIVE GRADATION   2.40 GRADATION

IMAGE FORMING APPARATUS

BACKGROUND OF THE INVENTION

1. Field of the Invention

The present invention relates to an electrophotographic image forming apparatus, and especially relates to an image forming apparatus, which appropriately adjust the excess and deficiency of electric potential after exposure caused by the uneven electrification and uneven sensitivity on the surface of photoreceptor.

2. Description of the Related Art

An electrophotographic image forming apparatus (such as a copier, printer, facsimile and the like) writes an electrostatic latent image by having the surface of photoreceptor (generally, drum-shaped photoreceptor) uniformly electrified to the prescribed initial electric potential by an electrification apparatus (electrification means), and by exposing the aforesaid electrified photoreceptor's surface by exposure means (such as the means of scanning laser source and its beam, and LED array).

Here, when an image formation is conducted, firstly, the value indicating the shading level of each pixel (hereinafter referred as to "gradation level") is determined based on the image data of the target image formation by the prescribed image processing means, and thereby, the surface of photoreceptor electrified by the electrification apparatus is exposed by the exposure means according to the exposure amount obtained by transforming (normally, linear transformation) of the aforesaid pixel gradation determined by the image processing means on the basis of the prescribed transformation data, into the exposure amount.

Incidentally, each photoreceptor has a peculiar electric-potential distribution, even if the surface of photoreceptor is uniformly electrified under a fixed condition by the electrification apparatus, since each photoreceptor has individual differences caused by the unevenness of such as the film thickness and material property in its surface member. Also, due to a distribution in the electrification amount of the electrification device itself, there occurs a distribution in the electrification amount of the photoreceptor occurring in a longitudinal direction of the electrification device. This is so-called "uneven electrification".

Also, even if each region having the same initial electric potential is exposed with the same exposure amount, the electric potentials does not necessarily decrease to the same value, causing unevenness. In other words, this is the situation where appears a distribution (unevenness) in the ratio of the difference in the electric potential decrease to the exposure amount (in other words, the slope of a graph showing the relationship between the exposure amount and the electric potential after exposure), and this is so-called "uneven sensitivity". Furthermore, there also occurs an electric potential distribution in the photoreceptor, due to uneven exposure as a phenomenon wherein the exposure amount by the exposing means becomes uneven in the width direction of the photoreceptor. For example, uneven exposure (the electric potential difference) is likely to occur between the center and around the both edges in the width direction of the photoreceptor, due to optical property of the exposing means.

Thus, in regard to these respective regions of the surface of photoreceptors which have individually different uneven electrification and sensitivity, if the pixel gradation is transformed into the exposure amount based on the same (common) transformation information (can be called "transformation factor"), even if each region is exposed with the same exposure amount, the electric potential after exposure differs in each region, thereby causing the uneven development (uneven density) since the density developed with toner (development density) has the excess and deficiency against the proper gradation level.

In general, in case of the apparatus which conducts gradation representation by the area coverage modulation method representing the image shading with arrays of the pixel gradation of multiple pixels (so-called, "digital machine"), although minute uneven sensitivity and uneven electrification less appear as uneven density compared to the apparatus which represents image shading with only shading per pixel (so-called, "analog machine"), the digital machine conducting gradation representation by area coverage modulation method is also unable to completely avoid uneven density when there exists uneven electrification having relatively large space period.

Especially, although the color image forming apparatus superimposing 4 color toner images of CMYK (Cyan, Magenta, Yellow and Black) forms a color-mixed gray image by superimposing 3 color toner images of CMY, an uniform color-mixed gray image can not be formed (uneven density occurs) when uneven electrification appears on the surface of photoreceptor after exposure, losing the balance in CMY.

For example, according to Japanese Patent Application Number 2003-154706, it has been considered that uneven density prominently appears when the electric potential after exposure has more than 5V of uneven electric potential. Such phenomenon appears more prominent in the so-called, "tandem-style color image forming apparatus". Also, since uneven electrification of the a-Si photoreceptor (the photoreceptor comprising photosensitive layer made of amorphous silicon) is generally larger than that of OPC photoreceptor, the uneven density of image becomes more prominent. Even if the quality standard (acceptance level) for the a-Si photoreceptor is decided to have 5V, or less uneven electrification, the yield significantly degrades, and that is not realistic.

Correspondingly, Japanese Patent Publication number 2003-154706 discloses the skill that provides the auxiliary exposure means to correct distribution of the initial electric rotation in the process of exposure for writing electrostatic latent image.

Also, the skill to correct the exposure amount based on the information of the sensitivity of photoreceptor, the skill to correct the uneven sensitivity per rotational position of the photoreceptor, the skill to correct the uneven sensitivity per exposure position of photoreceptor, and the skill to correct uneven sensitivity according to the data of sensitivity distribution of photoreceptor, are disclosed respectively in Japanese Patent Publication Numbers 1998-31332, 2000-162834, 2004-61860 and 2004-233694.

SUMMARY OF THE INVENTION

However, as disclosed in Japanese Patent Publication Number 2003-154706, there still remains the problem that the establishment of the independent exposure means separated form the exposure means for writing electrostatic latent image is not applicable in most cases due to the enlargement in size and the increase in cost. The problem about the space and cost becomes more prominent especially in tandem-style color image forming apparatus since the establishment of another exposure means is required for each of a plurality (normally four) of photoreceptor.

Also, the technologies disclosed in the Japanese Paten Publication Number 1998-31332, 2000-162834, 2004-61860 and 2004-233694 are to correct the uneven sensitivity of photoreceptor, in other words, to correct difference between the slope (ratio of difference of electric potential decrease to the difference of the exposure amount) in the exposure property of the standard photoreceptor (relationship between the exposure amount and the amount of electric potential decrease), and the slope in the exposure property of the photoreceptor which is a candidate for control, so that when there exists a distribution (uneven electrification) in the initial electric potential of the electrified photoreceptor before exposure, there still remains the problem that uneven density of an image can not be avoided since the distribution of the electric potential remains itself as offset.

Moreover, according to the technologies disclosed in Japanese Patent publication Number 1998-31332, 2000-162834, 2004-61860 and 2004-233694, the exposure amount is controlled on a per-pixel basis (per pixel). In this case, the exposure amount is controlled by controlling exposure time or exposure intensity per pixel, or by the combination thereof. However, there also remains the problem that is not capable of controlling the exposure amount with high accuracy due to the restriction of the resolution of exposure amount regulation in the aforesaid exposure control.

FIG. 8 shows the relationship between the pixel gradation and the electric potential of the photoreceptor exposed with the exposure amount corresponding to the pixel gradation (indicated in the figure by dashed line) in the photoreceptors, in which uneven electrification and uneven sensitivity coexist, made of a-Si (amorphous silicon). FIGS. 8 (a) and (b) respectively shows the property in the case of not correcting the exposure amount (indicated by thick and dashed line g01), and in the case of correcting uneven sensitivity of exposure amount (indicated by thick and dashed line g02). Also, the property indicated in present figure by the thick full line (g0) shows the reference (standard) property of photoreceptor (hereinafter, referred to as "reference property').

Here, although the horizontal axis in the graph of FIG. 8 (a) indicates the pixel gradation, the horizontal axis can be equivalent to the exposure amount as long as the transformation of the pixel gradation to the exposure amount is conducted based on a certain converting formula (the coefficient is fixed) or a converting table. Here, in FIG. 8(a), the graph lines g0 showing the property related to the standard photoreceptor and g01 showing the property related to the photoreceptor which is a object for control are examples of when both having the same converting (transforming) from the pixel gradation into the exposure amount. Hence, both the graph lines g0 and g01 can be regarded as equivalent to the graph line indicating the exposure property (the property of electric potential after exposure corresponding to the exposure amount).

As shown in FIG. 8 (a), the exposure property indicating the correspondence between the exposure amount and the electric potential after exposure in the photoreceptor (especially, a-Si photoreceptor) indicates such property that the electric potential after exposure linearly decrease as the exposure amount increase, generally shows almost linear-shape exposure property except for the convergence region (the region in which the slope of electric potential decrease against the exposure amount increase is very gentle) to residual potential (the electric potential which remains after maximum exposure). For example, in FIG. 8, while the exposure property g01 of the measured photoreceptor shows almost linear-shape exposure property in the range where the amount of electrification is less than or equal to 2E when the pixel gradation set I2, the exposure property g0 of the reference photoreceptor shows a almost linear-shape exposure property in the range where the amount of electrification is less than and equal to Es2 when the pixel gradation set Is2.

Also, as shown in FIG. 8 (a), when the measured photoreceptor simultaneously has uneven electrification and uneven sensitivity, the difference (equivalent to uneven electrification) in initial electric potential (electrified electric potential before exposure, i.e. y segment) and the difference in slopes of exposure property (equivalent to uneven sensitivity) occur with the reference exposure property g0. When the correction of uneven sensitivity of exposure amount (correction to conform slopes) is conducted to the aforesaid photoreceptor, as shown in FIG. 8(b), the electric potential difference corresponding to uneven electrification (difference in the initial electric potential) remains as a offset thereby causing the uneven density.

It is also considered to transform the pixel gradation into the exposure amount (to determine the exposure amount) in each position on the surface of the photoreceptors so as to conform the corresponding property (corresponding relationship) of the pixel gradation and the electric potential after being exposed at the exposure amount obtained by transforming of the pixel gradation, with the prescribed reference property over the range of all the pixel gradation except for the case where the pixel gradation level is 0 (in the case of not exposed).

The graph g02' in FIG. 9 shows the relationship between the pixel gradation and the electric potential after exposure, in the case of transforming the pixel gradation into the exposure amount so as to conform the electric potentials after being exposed by setting all pixel gradations but 0 pixel gradation level respectively, with the prescribed reference property when the exposure on the surface of photoreceptor in which the uneven electrification and the uneven sensitivity indicated as graph g0 in FIG. 8 (a) coexist.

However, if the transformation of the exposure amount as resulting in FIG. 9 is conducted, the gap $\Delta VO$ between the initial electric potential before exposure and the electric potential after being exposed by setting the pixel gradation level to 1 (minimum value except for 0), particularly becomes larger. When the aforesaid gap $\Delta VO$ is too large, there still remains the problem of degrading image quality since the continuity of density is disturbed when the image is represented in the halftone.

Consequently, the image forming apparatus in this invention has been invented in consideration of the foregoing conditions, and the purposes of this invention are as follows. They are to provide a image forming apparatus which can prevent the occurrence of uneven image density, as well as the image quality degradation caused by inhibiting the continuity of image density, by controlling the exposure amount, on the photoreceptor in which uneven electrification exists, and additionally uneven sensitivity coexists, without enlargement of the apparatus as well as increase in the cost, and thereby further controlling the exposure amount in high accuracy (high resolution).

In order to achieve the foregoing purposes, this invention consists of any of construction indicated below as the first invention, the second invention, the third invention and the forth invention.

[The First Invention]

The first invention is applied to the image forming apparatus, which determines the pixel gradation indicating gray level per pixel by the image processing means based on the prescribed image data, such as the reading image data from manuscript in coping machines, and the image data of printing job in printers, and further, writes the electrostatic latent image onto the photoreceptor by exposing the surface of photoreceptor previously electrified by the electrification means in accordance with the exposure amount obtained by transforming the pixel gradation determined by the image processing means by means of the exposure means (exposure means for writing electrostatic latent image). Furthermore, for each of the segments multi-divided in the surface of photoreceptor, the image forming apparatus according to the first invention previously records the differential information corresponding to the difference between the initial electric potential (the electric potential before exposure and after electrification) in each of the aforesaid segments and the reference initial electric potential that is common between all the segments into the recording means (individual differential information recording means), and then controls the exposure means to expose at the exposure amount obtained by offsetting with the exposure amount corresponding to the differential information (hereinafter referred to as "the exposure amount after addition") when the pixel gradation in each of the segments is within the prescribed range including 0 level gradation against the exposure amount obtained by approximately linearly transforming the pixel gradation determined by the image processing means into exposure amount.

As described above, in regard to the photoreceptor (the electrified photoreceptor) in which the uneven electrification exist (distribution of the initial electric potential), the property of electric potential after exposure corresponding to the pixel gradation, approaches to or conform with the reference property setting the reference initial electric potential as the initial electric potential, by exposing each of the segments at the exposure amount after addition (offset), added the exposure amount corresponding to the difference between the initial electric potential and the reference initial electric potential. As a result, the fluctuations in the exposed electric potentials in each position on the surface of the photoreceptor can be inhibited, and the occurrence of uneven density of the image therefore can be minimized. Especially, the image processing means that indicates the gray level in the area coverage modulation method is preferred to prevent appearing uneven density of an image caused by relatively large space period existing in the uneven electrification.

Moreover, since the pixel having 0 pixel gradation level, not exposed in the conventional method, can also be exposed at the exposure amount offset corrected (correction to the exposure amount after the approximate linear transformation), the gap of the electric potential after exposure ($\Delta$ V O in FIG. 9) between of when the pixel gradation level is 0, and of when the pixel gradation level is one, can be restrained. As a result, the image quality is therefore not be degraded by inhibiting the continuity of halftone density.

Furthermore, without additional exposing means and the like, the above transformation can be realized by exposure amount control by the existing exposure means for writing electrostatic latent image (the adjustment of the transformation from the pixel gradation into the exposure amount), thereby not causing enlargement of the apparatus as well as increase in the cost.

Additionally, it is considered to previously record the slope information, which defines the slope of when the pixel gradation is approximately linearly transformed into the exposure amount, into the recording means (the individual slope information recording means), and then controls the exposure means to expose at the exposure amount obtained by offsetting with the exposure amount corresponding to the differential information against the exposure amount obtained by approximately linearly transforming the pixel gradation determined by the image processing means according to the slope information.

According to the foregoing system, as described hereinafter, in the photoreceptor in which the uneven electrification and the uneven sensitivity coexist, the property of electric potential after exposure corresponding to the pixel gradation approximately conform with the reference property all over the range of the gradation indicating linear property including 0 level gradation. As a result, in the photoreceptor in which the uneven electrification and the uneven sensitivity coexist, the fluctuation in the electric potentials after exposure in each position on its surface, can be almost eliminated, and the effect of preventing the occurrence of the uneven density of image can be further enhanced.

Here, as a means to control the exposure amount corresponding to the differential information, it is considered to control the exposure amount for each pixel corresponding to the differential information (exposure time control) by controlling the exposure time per pixel by the exposure means.

Generally, the exposure means such as LED array often conducts exposure during the time from when the exposure start instructions is given till the periodic signal continuously generated in a prescribed period is generated for the specified counts.

When the above-described exposure means is employed, as the exposure time control, for example, it is considered to adjust the exposure time per pixel, such as by controlling the time from when the exposure start instruction is generated till the first periodic signal is generated, corresponding to the differential information with specifying, to the exposure means, the value corresponding to the pixel gradation as the counts (the value corresponding to the size of pixel gradation), and by specifying, to the exposure means, the value corresponding to the pixel gradation, offset with the value corresponding to the differential information, as the count.

Also, in case that the exposure means is employed to conduct exposure during the time from when the exposure start instruction is generated till the exposure terminating instruction is generated, it is considered to control the exposure time of each pixel by controlling the time from when the exposure start instruction is generated till the exposure terminating instruction is generated.

At same time, the control (adjustment) of the exposure amount varying corresponding to the slope information, is conducted by adjusting the exposure intensity by the exposure means (such as adjustment of the supply capability to the luminous part).

[The Second Invention]

The second invention is applied to the image forming apparatus, which determines the pixel gradation indicating gray level per pixel by the image processing means based on the prescribed image data, such as the reading image data from manuscript in coping machines, and the image data of printing job in printers, and further, writes the electrostatic latent image onto the photoreceptor by exposing the surface of photoreceptor previously electrified by the electrification means in accordance with the exposure amount obtained by transforming the pixel gradation determined by the image processing means by means of the exposure means (exposure means for writing electrostatic latent image). Furthermore, for each of the segments multi-divided in the surface of photoreceptor, the second invention previously records the differential information corresponding to the difference between the initial electric potential (the electric potential before exposure and after electrification) in each of the aforesaid segments and the reference initial electric potential that is common between all the segments into the recording means (individual differential information recording means), and then controls the exposure means to expose at the exposure amount obtained by offsetting with the exposure amount corresponding to the differential information (as described above, hereinafter referred to as "the exposure amount after addition") when the pixel gradation in each of the segments is within the prescribed range including 0 level gradation against the exposure amount obtained by approximately linear-transforming the pixel gradation determined by the image processing means into exposure amount. Here, although the exposure amount is determined by the product of the exposure intensity and exposure time, the exposure intensity by the exposure means is adjusted based on the differential information as well as the exposure time by the exposure means is adjusted at lease based on the pixel gradation.

As described above, in regard to the photoreceptor (the electrified photoreceptor) in which the uneven electrification exist (distribution of the initial electric potential), the property of electric potential after exposure, corresponding to the pixel gradation, approaches to or conform with the reference property setting the reference initial electric potential as the initial electric potential, by exposing each of the segments at the exposure amount after addition (offset), added the exposure amount corresponding to the difference between the initial electric potential and the reference initial electric potential. As a result, the fluctuations in the exposed electric potentials after exposure in each position on the surface of the photoreceptor can be inhibited, and the occurrence of uneven density therefore can be minimized as well as possible. Especially, the image processing means that indicates the gradation by the area coverage modulation method is preferred to prevent appearing uneven density of an image caused by relatively large space period existing in the uneven electrification.

Moreover, since the pixel having 0 pixel gradation level, not exposed in the conventional method, can also be exposed at the exposure amount offset corrected (correction to the exposure amount after the approximate linear transformation), the gap of the electric potential after exposure ($\Delta V O$ in FIG. 9) between of when the pixel gradation level is 0, and of when the pixel gradation level is one, can be control be restrained. As a result, the image quality is therefore not be degraded by inhibiting the continuity of halftone density.

Furthermore, without additional exposing means and the like, the above transformation can be realized by exposure amount control by the existing exposure means for writing electrostatic latent image (the adjustment of the transformation from the pixel gradation into the exposure amount), thereby not causing enlargement of the apparatus as well as increase in the cost.

Here, controlling the exposure intensity by the exposure means to be maintained constant during the exposure of one pixel, for example, is suitable for the case having difficulties in temporally separating the exposure for controlling the exposure amount corresponding to the differential information, from the exposure based on the pixel gradation, and in changing the exposure intensity for each of the exposures. Also, in this case, it is obviously necessary to set the exposure intensity for each pixel since the different exposure time is necessary at the different pixel gradation even if the differential information is the same.

Also, it is considered to control the exposure time of the exposure means based on the pixel gradation and the differential information.

In this case, in relation to the exposure amount control based on the differential information, if the exposure intensity by the exposure means is adjusted within the prescribed allowable range, and the exposure amount for the deficiency from the exposure intensity adjustment within the aforesaid allowable range is adjusted by the exposure time by the exposure means, the degradation of image quality caused by the overgrown adjustment rage of exposure intensity can be prevented. Especially, in the case where the exposure intensity is maintained constant during the exposure of one pixel, it is capable of preventing the inconvenience of significantly enhancing the exposure intensity in order to offset (add) the exposure amount corresponding to the differential information when the exposure time is short in accordance with the small value of the pixel gradation.

Additionally, it is considered to previously record the slope information, which defines the slope of when the pixel gradation is approximately linear-transformed into the exposure amount, into the recording means (the individual slope information recording means), and then controls the exposure means to expose at the exposure amount obtained by offsetting with the exposure amount corresponding to the differential information against the exposure amount obtained by approximately linearly transforming the pixel gradation determined by the image processing means according to the slope information. In this case, in relation to the exposure amount control, exposure intensity control of the exposure means may be conducted based on the slope information of the each divided segment.

According to the foregoing system, as described hereinafter, in the photoreceptor in which the uneven electrification and the uneven sensitivity coexist, the property of electric potential after exposure corresponding to the pixel gradation approximately conform with the reference property all over the range of the gradation indicating linear property including 0 level gradation. As a result, in the photoreceptor in which the uneven electrification and the uneven sensitivity coexist, the fluctuation in the electric potentials after exposure in each position on its surface, can be almost eliminated, and the effect of preventing the occurrence of the uneven density of image can be further enhanced.

[The Third Invention]

The third invention is applied to the image forming apparatus, which determines the pixel gradation indicating gray level per pixel by the image processing means based on the prescribed image data, such as the reading image data from manuscript in coping machines, and the image data of printing job in printers, and further, writes the electrostatic latent image onto the photoreceptor by exposing the surface of photoreceptor previously electrified by the electrification means in accordance with the exposure amount obtained by transforming the pixel gradation determined by the image processing means by means of the exposure means (exposure means for writing electrostatic latent image). Furthermore, for each of the segments multi-divided in the surface of photoreceptor, the third invention previously records the differential information corresponding to the difference between the initial electric potential (the electric potential before exposure and after electrification) in each of the aforesaid segments and the reference initial electric potential that is common between all the segments into the recording means (individual differential information recording means), and then controls the exposure means to expose at the exposure amount obtained by offsetting with the exposure amount corresponding to the differential information when the pixel gradation in each of the segments is within the prescribed range including 0 gradation level corresponding to the exposure amount obtained by approximately linearly transforming the pixel gradation determined by the image processing means into exposure amount. Here, the exposure equivalent to the exposure amount obtained by the approximate linear transformation of the pixel gradation into the exposure amount and the exposure equivalent to the exposure amount of additional exposure on the basis of the differential information can be conducted to each pixel at different separated time zone, and the exposure equivalent to the exposure amount added (offset) corresponding to the differential information can be conducted at the multiple separated positions (or multi-divided positions or multi-separated positions) in each pixel.

As described above, in regard to the photoreceptor (the electrified photoreceptor) in which the uneven electrification exist (distribution of the initial electric potential), the property of electric potential after exposure, corresponding to the pixel gradation, approaches to or conform with the reference property setting the reference initial electric potential as the initial electric potential, by exposing each of the segments at the exposure amount after addition (offset), added the exposure amount corresponding to the difference between the initial electric potential and the reference initial electric potential. As a result, the fluctuations in the exposed electric potentials in each position on the surface of the photoreceptor can be inhibited, and the occurrence of uneven density in the image therefore can be minimized as well as possible. Especially, the image processing means that indicates the gray level by the area coverage modulation method is preferred to prevent appearing uneven density of an image caused by relatively large space period existing in the uneven electrification.

Moreover, since the pixel having 0 pixel gradation level, not exposed in the conversion method, can also be exposed at the exposure amount offset corrected (correction to the exposure amount after the approximate linear transformation), the gap of the electric potential after exposure ($\Delta V O$ in FIG. 9) between of when the pixel gradation level is 0, and of when the pixel gradation level is one, can be restrained. As a result, the image quality is therefore not be degraded by inhibiting the continuity of halftone density.

Furthermore, without additional exposing means and the like, the above transformation can be realized by exposure amount control by the existing exposure means for writing electrostatic latent image (the adjustment of the transformation from the pixel gradation into the exposure amount), thereby not causing enlargement of the apparatus as well as increase in the cost.

Coincidentally, when the exposure per pixel equivalent to the exposure amount added (offset) on the basis of the differential information is conducted focusing (concentrating) on one position (at one time), as hereinafter descried, the electric potential distribution occurs within one pixel, and this may becomes a factor of image quality degradation.

In response, when the exposure for one pixel equivalent to the exposure amount added (offset) on the basis of the differential information is conducted at multiple separated positions (more than once), as hereinafter descried, the electric potential distribution is smoothed, and then the image quality degradation therefore can be prevented.

For example, in relation to the pixel where the pixel gradation level is at least 0, it is preferred to conduct the exposure equivalent to the exposure amount added on the basis of the differential information at multiple separated positions, at interval (distance) of approximately equal to or less than two third of the exposure-beam diameter of the exposure means.

Also, in relation to the pixel where the pixel gradation level is one or more, it is preferred to conduct the exposure equivalent to the exposure amount added on the basis of the differential information at separated multiple positions which put with at least the exposure position among equivalent to the exposure amount at least obtained by the approximate linear transformation of the pixel gradation into the exposure amount.

[Common Elements Between the First, the Second and Third Inventions]

Also, the segments corresponds to the regions multi-dividing the surface of the dram-shaped photoreceptor in the axial direction, in the circumferential direction (one-dimensional segmentation) or in the both directions (two-dimensional segmentation). For example, the surface of photoreceptor can be segmented by the width or height of one pixel, or by the width and height of a plurality of pixels.

Here, it is obvious that the exposure means needs to conduct an exposure as recognizing each position of the segments. In general, regarding the exposure positions in the axial direction (in other words, "the main scanning direction") on the surface of the photoreceptor, the exposure means (or its control means) recognizes (detects) the writing position at least on a per-pixel basis. On the other hand, regarding the absolute position in the circumferential direction (in other words, "sub scanning direction") in the surface of the photoreceptor, since it is not directly necessary information for image formation, it is necessary to provide the means to detect a rotational position of the photoreceptor.

[The Fourth Invention]

The fourth invention is applied to the image forming apparatus, which determines the pixel gradation indicating gray level per pixel by the image processing means based on the prescribed image data, such as the reading image data from manuscript in coping machines, and the image data of printing job in printers, and further, writes the electrostatic latent image onto the photoreceptor by exposing the surface of photoreceptor previously electrified by the electrification means in accordance with the exposure amount obtained by transforming the pixel gradation determined by the image processing means by means of the exposure means (exposure means for writing electrostatic latent image). Furthermore, the fourth invention also corrects (pixel gradation correction) the pixel gradation determined by the image processing means, for each of the segments multi-divided in the surface of the photoreceptor, consisting of regions for a plurality of pixels, in accordance with the information (hereinafter referred to as "corrective pixel & gradation information"), related to the corrective gradation of the pixel gradation in the array of the candidate pixel for correction previously determined by the image processing in the area coverage modulation method and the respective candidate pixels for correction, (hereinafter referred to as "corrective pixel & gradation information") (the pixel gradation correction), and then controls the exposure means to expose with the exposure amount corresponding to the corrected pixel gradation.

Here, it is contemplated that, as the area coverage modulation method employed for the determination of the corrective pixel & gradation information, such as the screen method or the error diffusion method are appropriate.

Also, the corrective pixel & gradation information previously recorded in the recording means can be employed as the said information, or can be determined by the image processing based on the prescribed information.

For example, it is contemplated that, for each of the segments, the differential information related to the difference between the exposure property representing the correspondence between the average exposure amount of the entire segments and the electric potential after exposure, and the reference property common between all the segments, is memorized in the memory means, and then, after determining the corrective pixel & pixel gradation information based on the differential information for each of the segments, the pixel gradation of each pixel in each of the segments is corrected according to the aforesaid determined result.

Also, the previously determined corrective pixel & gradation information can be memorized in the memory means, and then, according to the recorded information, the pixel gradation of each pixel in each of the segments can be corrected in each of the segments.

As described above, by conducting the exposure amount correction as spreading the candidate pixel for correction by the image processing of the area coverage modulation method, for each of the segments consisting of a plurality of pixels, even if the resolution of the exposure amount adjustment is low, the resolution as the exposure amount adjustment over the entire segments becomes high in accordance with the relationship of [Resolution=m·(n−1)+1, here, n indicates the resolution of pixel gradation; m indicates number of pixel in the segment] corresponding to the number of pixel comprising the segment. Accordingly, it is possible to adjust the exposure amount of the entire segments with a high degree of accuracy.

Especially, when the image processing means which conducts the gradation representation based on the image data by the area coverage modulation method that determines arrangement of the pixel gradation per unit pixel group consisting of a plurality of pixels (so-called, "the image processing means of digital machine"), the fourth invention is suitable for being capable to prevent the small uneven sensitivity and uneven electrification appearing as the uneven density of an image, and to prevent the uneven electrification from appearing as the uneven density of an image, by the exposure amount adjustment of the area coverage modulation method on a per-segment basis, even though the uneven electrification having relatively large space period exists.

Here, it is contemplated that when the corrective pixel & gradation information is the information in which the average value of the corrective gradation in the its information is equivalent to the value corresponding to the difference between, the exposure property representing the correspondence between the average exposure amount of the entire segments and the electric potential after exposure, and the reference property common between all the segments, the pixel gradation is corrected based on the corrective pixel & gradation information even if the pixel gradation of all pixels in the segments, is 0 level gradation. For example, the information, where the average value of the corrective gradation per segment is, equivalent to the value (for example, the value offset the difference) corresponding to the difference between the initial electric potential in the average exposure property for all the segments, and the initial electric potential in the reference property, is also considered as the corrective pixel & gradation information.

According to the above constructions, since the pixel gradation is corrected including in the case where the pixel gradation is 0 gradation level where the exposure is not conducted like conventional one (in other words, a correction of exposure amount), the exposure amount is corrected (offset) corresponding to the difference in the initial electric potential (difference corresponding to initial referential electric potential), and thereby the gap of the electric potential after exposure between of when the pixel gradation level is 0 and of when the pixel gradation level is one, can be restrained. As a result, the image quality is therefore not be degraded by inhibiting the continuity of halftone density.

Also, if the number of pixel in the vertical direction is the same as the number of pixel in the lateral direction, between the segments which is a unit of the area coverage modulation method in the exposure amount correction, and the unit pixel group which is a unit of the area coverage modulation method determining the pixel gradation for image formation (writing a electrostatic latent image), the space periods of the array of the gradation determined by the respective area coverage modulation methods become identical, and thereby the moire caused by the reciprocal interference of the space periods can be prevented.

Also, even if the area coverage modulation method employed for determination of the corrective pixel & gray level information, and the area coverage modulation method employed for determination of the pixel gradation by the said image processing means, are the screen systems, where each screen angle is reciprocally shifted fifteen degree or more, the occurrence of moire also can be prevented.

[Elements Between the First, the Second, the Third and Fourth Inventions]

Also, this invention is preferred to an a-Si photoreceptor where uneven electrification often remarkably occurs. Concretely speaking, collecting the uneven electrification is effective in the a-Si photoreceptor where the uneven electrification caused by the unevenness of the membrane thickness is larger than uneven sensitivity caused by the unevenness of the membranous property, due to manufacturing reasons.

Moreover, uneven sensitivity can be corrected sufficiently by adjusting the exposure time, and even better control can be realized.

SUMMARY OF THE INVENTION

According to the present invention, since, for each segments multi-divided in the surface of photoreceptor, addition (offset) of the exposure amount is conducted corresponding to the difference, between its initial electric potential and the reference electric potential, including in the case where the pixel gradation level is 0, the fluctuations in the exposed electric potentials in each position on the surface of the photoreceptor having the uneven electrification, can be inhibited, and the occurrence of uneven density in the image therefore can be prevented.

Moreover, since the pixel having 0 level pixel gradation, not exposed like conventional image forming apparatus, also can be offset with the exposure amount corresponding to the difference in the initial potential, the gap of the electric potential after exposure between of when the pixel gradation level is 0, and of when the pixel gradation level is one, can be restrained. As a result, the image quality is therefore not be degraded by inhibiting the continuity of halftone density.

Furthermore, without additional exposing means and the like, the above adjustment of exposure amount control by the existing exposure means for writing electrostatic latent image is conducted, thereby not causing enlargement of the apparatus as well as increase in the cost.

Also, as disclosed as the first invention, if, per segment, the exposure intensity adjustment by the said exposure means is controlled based on the slope information which specifies the slope of when the pixel gradation is approximately linearly transformed into the exposure amount, as well as conducting the addition control of the exposure amount corresponding to the distribution of the initial electric potential per segment by adjusting the exposure time by the exposure means, the fluctuation in the electric potential after exposure of each position on the surface of the photoreceptor in which the uneven electric potential and uneven sensitivity coexist, can be further minimized, and the prevention of the uneven density of image therefore becomes more effective.

Also, as disclosed as the second invention, when the exposure intensity adjustment by the said exposure means is controlled per segment based on the slope information which specifies the slope of when the pixel gradation is approximately linearly transformed into the exposure amount, as well as conducting an addition control of the exposure amount corresponding to the distribution of the initial electric potential of each segment, the fluctuation in the electric potential after exposure of each position on the surface of the photoreceptor in which the uneven electric potential and uneven sensitivity coexist, can be further minimized, and the prevention of the uneven density of image therefore becomes more effective.

Also, as disclosed as the third invention, when the exposure equivalent to the exposure amount obtained from the approximate linear transformation of the pixel gradation into the exposure amount and the exposure equivalent to the amount of additional exposure on the basis of the differential information can be conducted to each pixel at different time, and the exposure equivalent to the exposure amount added (offset) corresponding to the differential information is conducted at the multiple positions in each pixel, the electric potential distribution in a pixel becomes smooth and the degradation of image is prevented.

Also, according to the fourth invention, since, by the segments unit comprising multi pixels in the surface of photoreceptor, the pixel gradation for the image formation is corrected according to the information of the pixel arrangement (arrangement of the corrective gradation) determined by the image processing in the area coverage modulation method, the resolution of the exposure amount adjustment per pixel is even low, as the resolution of the exposure amount adjustment over the entire segments dramatically becomes high corresponding to the number of pixel comprising the segment. Accordingly, it is possible to adjust the exposure amount of the entire segments with high accuracy.

Especially, when the image processing means which conducts the gradation representation based on the image data by the area coverage modulation method that determines arrangement of the pixel gradation per unit pixel group consisting of a plurality of pixels (so-called, "the image processing means of digital machine"), the fourth invention is suitable for being capable to prevent the small uneven sensitivity and uneven electrification appearing as the uneven density of an image, and to prevent the uneven electrification from appearing as the uneven density of an image, by the exposure amount adjustment of the area coverage modulation method on a per-segment basis, even though the uneven electrification having relatively large space period exists.

Also, when the average value of the corrective gradation in the corrective pixel & gradation information is equivalent to the value corresponding to the difference between, the exposure property representing the correspondence between the average exposure amount of the entire segments and the electric potential after exposure, and the reference property common between all the segments, and the pixel gradation is corrected based on the corrective pixel & gradation information even if the pixel gradation level of all pixels in the segments, is 0, since the pixel gradation is corrected including in the case where the pixel gradation level is 0 where the exposure is not conducted like conventional image forming apparatus, the exposure amount is corrected (offset) corresponding to the fluctuation in the initial electric potential (difference between the initial electric potential and the reference initial electric potential), and thereby the gap of the electric potential after exposure between of when the pixel gradation level is 0, and of when the pixel gradation is 1, can be restrained. As a result, the image quality is therefore not be degraded by inhibiting the continuity of halftone density.

Also, when the number of pixel in the vertical direction is the same as the number of pixel in the lateral direction, between the segments which is a unit of the area coverage modulation method in the exposure amount correction, and the unit pixel group which is a unit of the area coverage modulation method determining the pixel gradation for image formation, and when the area coverage modulation method employed for determination of the corrective pixel & gray level information, and the area coverage modulation method employed for determination of the pixel gradation by the said image processing means, are the screen systems, where each screen angle is reciprocally shifted fifteen degree or more than fifteen degree, the moire caused by the reciprocal interference of the arrangement of the gradation determined by each of the aforesaid area coverage modulation method, can be prevented.

BRIEF DESCRIPTION OF THE DRAWINGS

FIGS. 3 (*a*) and (*b*) are graphs according to the first embodiment in the image forming apparatus X, showing the controlling property of the exposure amount corresponding to pixel gradation, as well as the relationship between the pixel gradation and the electric potential after exposure at that time.

FIGS. 4 (*a*) and (*b*) are graphs according to the second embodiment in the image forming apparatus X, showing the controlling property of the exposure amount corresponding to pixel gradation, as well as the relationship between the pixel gradation and the electric potential after exposure at that time.

FIGS. 18 (a) and 18 (b) are graphs respectively showing the correspondence between the average pixel gradation of all the segments and that after corrected based on the first embodiment of the differential information, and the relationship between the original average pixel gradation and the electric potential after exposure, of when conducting the exposure, in accordance with the pixel gradation after correction;

FIGS. 19 (a) and 19 (b) are graphs respectively showing the correspondence between the average pixel gradation of all the segments and that after corrected based on the second embodiment of the differential information, and the relationship between the original average pixel gradation and the electric potential after exposure, of when conducting the exposure, in accordance with the pixel gradation after correction;

FIGS. 24 (a) and 24 (b) are figures respectively showing the arrangement of pixel gradation based on the image data and the fifth example of corrective pixel and gradation information.

DETAILED DESCRIPTION OF THE PREFERRED EMBODIMENTS

Figure 1:
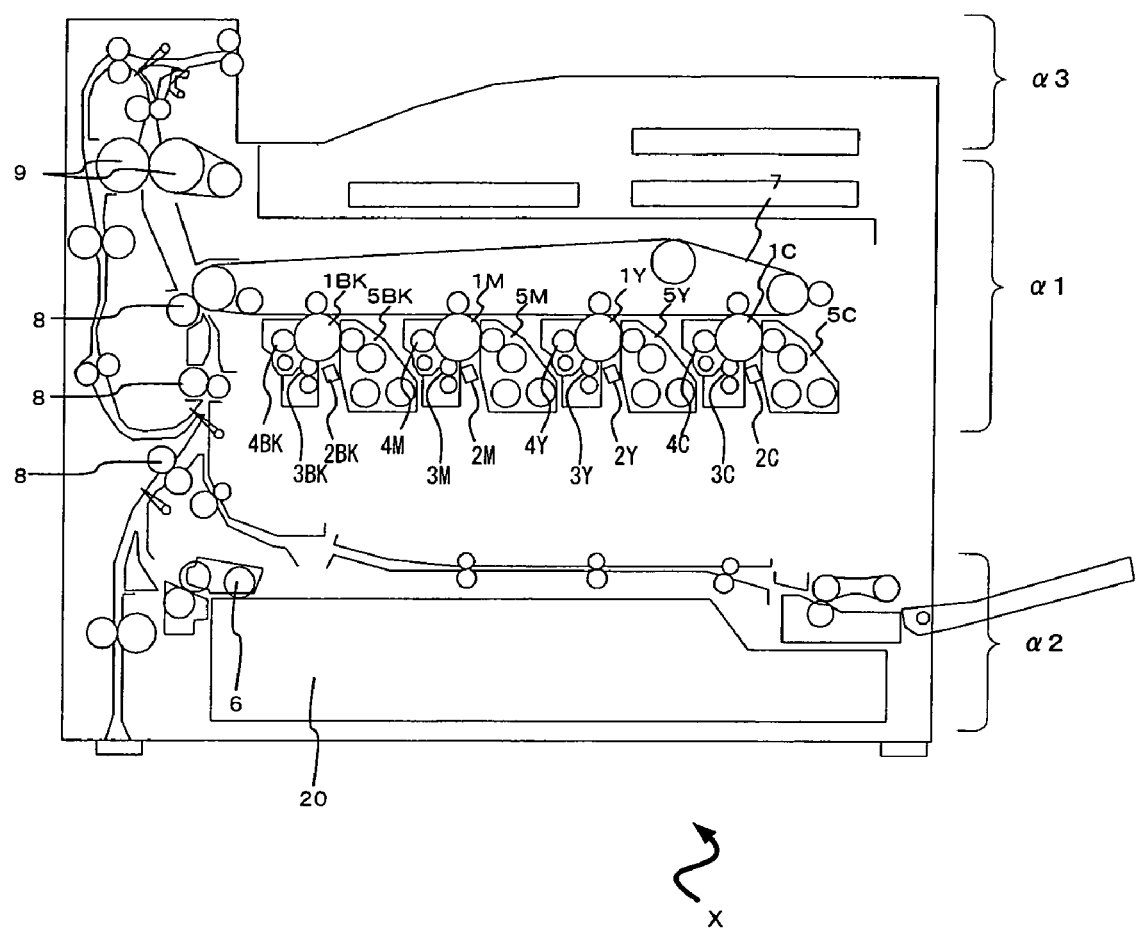
FIG. 1 is a schematic cross-sectional view of an image forming apparatus X according to an embodiment of the present invention.

With embodiments of the present invention described hereinafter with reference to the accompanying drawings, it is to be understood that the invention is not limited to those precise embodiments, and that various changes and modifications may be effected therein by one skilled in the art without departing from the scope or spirit of the invention as defined in the appended claims.

Referring now to the accompanying cross-sectional view FIG. 1, the entire structure of the image forming apparatus X according to an embodiment of the present invention will be described.

The image forming apparatus X is the printer as an example of the image forming apparatus of the tandem system using the four-color toner: black (BK), magenta (M), yellow (Y) and cyan (C).

The image forming apparatus X comprises a image forming unit α1 forms toner images and forms images on to the recording paper, a paper-feed unit α2 to feed the recording paper to the image forming unit α1, and a paper-eject unit α3 to eject the recording paper on which images are formed.

The image information (the printer job) received by a communication member (not shown) from the external apparatus such as personal computers is transformed into the pixel gradation as density information of each pixel to each of four colors, i.e. black (BK), magenta (M), yellow (Y) and cyan (C) by means of the image processing unit 12 described in below.

The image forming part α1 schematically comprises the followings:

Four photoreceptor drums 1 supporting images of each of the four colors (1BK for black, 1M for magenta, 1Y for yellow and 1C for cyan);

Electrification apparatuses 3 (3BK, 3M, 3Y and 3C) uniformly electrifying each surface of the photoreceptor drums 1;

Exposing sources 2 (2BK, 2M, 2Y, 2C and one example of exposure means) writing the electrostatic latent image on to the photoreceptor drums 1 by illuminating (exposing) each of the surface of the photoreceptor drums 1 previously electrified by the electrification apparatuses 3 with the light equivalent to the exposure amount corresponding to the pixel gradation determined by the after-mentioned image processing unit 12;

Development apparatuses 5 (5BK, 5M, 5Y and 5C) developing toner images by feeding toners to the electrostatic latent image;

An intermediate transfer belt 7, on which the toner images formed on the surface of the photoreceptor are respectively transferred, then transferring the toner images onto the recording paper;

Feeding rollers 8 feeding the recording paper;

Fixing apparatus 9 heat-fixing the toner images transferred onto the recording paper;

Neutralization apparatuses 4 (4BK, 4M, 4Y and 4C) neutralizing the surface of the photoreceptor drums 1 which already transferred the toner images onto such as the recording paper.

The photoreceptor drum 1 is, for example, such as a-Si photoreceptor that has high durability due to the high hardness and stability of its property while relatively easily having uneven electrification as well as uneven sensitivity.

Although electrification apparatus 3 is for uniformly electrifying the surface of the said photoreceptor drums 1 along the axial direction, the distribution of the electric potential (the initial electric potential) after electrification (before exposure) in the said electrification apparatuses 3 occurs in case that the said photoreceptor drums 1 have uneven electrification.

Exposing source 2 shown in FIG. 1 indicates an example of exposing source that consists of LED array where a plurality of LED is arrayed for each pixel in the axial direction (main scanning direction) of the said photoreceptors. Besides the above construction, exposing source 2 can also consist of such as the laser scanner scanning laser beam in the axial direction of the said photoreceptor drums 1.

Developing apparatus 5 comprises an developing roller which feeds toners to the photoreceptor drums 1, such that the toner on the developing roller is pulled up to the surface of the photoreceptor drums 1 according to the electric potential gap (difference) between the electric potential impressed on the developing roller (developing bias potential) and that on the surface of the photoreceptor drums 1, and thereby clearly visualizing the electrostatic latent image as a toner image.

Paper-feed unit α2 schematically comprises such as a paper-feed cassette 20 moire and paper-feed roller 6. The recording paper previously held in paper-feed cassette 20 is carried to the said image forming unit α1 by the rotational-drive of paper-feed roller 6.

The recording paper fed from paper-feed-unit α2 is fed by feeding roller 8, and at the same time, transferred with the toner image from the intermediate transfer belt 7. Then, the recording paper on which the toner image is transferred is fed to fixing apparatus 9, heat-fixed by such as heating roller, and fed to the ejecting unit α3 for ejection.

Figure 2:
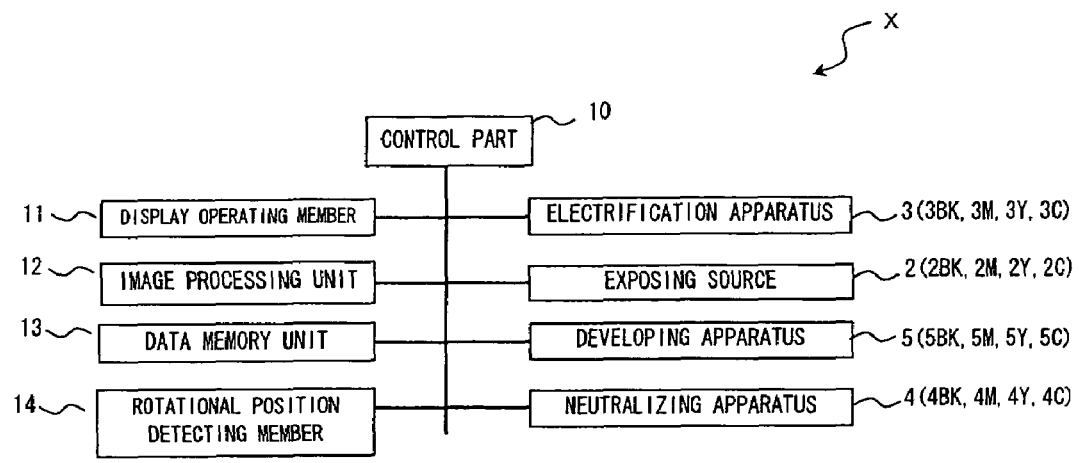
FIG. 2 is a block diagram showing the first example of a schematic structure of the main part of the image forming apparatus X.

FIG. 2 is a block diagram showing the schematic construction of main part of the image forming apparatus X.

Image forming apparatus X comprises control member 10 controlling each of the components of image formation apparatus X comprised with MPU and its peripheral apparatus such as ROM and RAM in addition to electrification apparatus 3, exposing source 2, developing apparatus 5 and neutralizing apparatus 4, and include a display operation member 11 such as liquid-crystal-display touch panel used as an information display means for user as well as the means to input information according to the user's operation, an image processing unit 12 conducting the various image processing, a data memory unit 13 such as EEPROM which can read, write and memorize various data, and a rotation position detecting member 14 detecting the position of rotating direction of each of the photoreceptor drum 1.

Image processing unit 12 executes the processing in which the pixel gradation indicating the gray level of each pixel for each toner color is determined in digital form based on the prescribed image data (such as printing jobs) inputted from external apparatus via communication control member (not shown).

Here, image processing unit 12 represents the density gradation of images based on the data using the area coverage modulation methods such as the error diffusion system and the screen system determining the array of printing pixel (drawn pixel) and the pixel gradation of printing pixel per unit of pixel groups consisting of a plurality of pixels (hereinafter referred to as "unit pixel group").

Data memory unit 13 individually and previously memorizes, per segment multi-divided in the surface of the respective photoreceptor drums 1, the offset exposure amount that is the information that the difference (V) between the initial electric potential per segment and the reference initial electric potential common to all the segments (hereinafter, referred to as "the reference initial electric potential) is transformed into the exposure amount ($\mu J/cm^2$), as the information for controlling the exposure amount by the exposing source 2 based on the pixel gradation. (one example of individual differential information recording means). The particulars thereof are hereinafter described.

Here, the segments can be, for example, such as the region corresponding to each pixel {width of one pixel (in the axial direction)×height of one line (in the circumferential direction)}, and the region corresponding to the unit pixel group employed for the image processing in the area coverage modulation method in the image processing unit 12.

The control member 10 obtains the pixel gradation determined by image processing unit 12, and individually controls the exposure amount by exposing source 2 per photoreceptor 1 and segment based on the pixel gradation and offset exposure amount (one example of the means for exposure amount control). Hereinafter, this exposure amount control is referred to as the individual exposure amount control. As a result, each of exposing sources 2 expose each of the segments at the exposure amount according to the individual exposure amount control.

Also, control member 10 controls the exposure of the exposing source 2 recognizing the each position of the segments (exposure position).

In other words, when LED array is employed as the exposing source 2, since LED is arrayed corresponding to each pixel, the control member 10 recognizes the exposure position in the axial direction (main scanning direction) on the surface of the photoreceptor drums 1 by the array position of the illuminating LED (such as array numbers).

On the other hand, regarding the exposure positions in the circumferential direction (sub scanning direction) on the surface of the photoreceptor drums 1, the rotational position detecting member 14 detects which position on the surface of the photoreceptor drums 1 is the light irradiation position of the exposing source 2, and the control member 10 recognizes the exposure position by obtaining the detected result.

At same time, the data memory unit 13 memorizes the combination of the identification information of LED (such as LED array numbers) and the detection value of the rotational position detecting member 14 as identification information of each segment, and further memorizes the offset (added) exposure amount corresponding to each of those combinations (identification information of each of the segments).

Control member 10 also extracts (detects) and reads out the offset exposure amount employed for the individual exposure amount control from data memory unit 13 based on the LED position (such as array number) to be illuminated and the result detected by rotational position detecting part 14.

Also, the construction of the rotational position detecting member 14 may include the construction setting up the rotary potentiometer at the rotation axis of the photoreceptor drum 1 so as to detect the rotational position, and the construction setting up the reference member such as protruding portion at the rotation axis of the photoreceptor drum 1 so as to detect the passing position of the reference member by such as a contact-type switch and a photo coupler, thereby detecting the elapsed time from the starting time of detecting.

In case that the laser scanner is employed as the exposing source 2, the exposure position in the axial direction (the main scanning direction) on the surface of the photoreceptor drum 1 may be detected by, such as detecting the rotational position of the polygon mirror employed for the laser scanning, or detecting the elapsed time from when the deflection of the laser beam to a prescribed basing-point position is detected by a light-detecting element.

Control member 10 further comprises the pulse signal control circuit (not shown) conducting the frequency-dividing and/or counting of the prescribed clock signals, and controls the exposure time of exposing source 2 by outputting the various signals generated by the pulse signal control circuit to the exposing source 2. More details will hereinafter be described.

The said offset exposure amount (a example of differential information) will hereinafter be described.

The image forming apparatus X is, in such as the manufacturing phase, submitted to the property evaluation test for obtaining the exposure property of each of the photoreceptor drums 1 built therein. More concretely, in the property evaluation test (pre-measurement), the exposing source 2 exposes to each of the segments on the surfaces of the photoreceptor drums 1 electrified by the electrification apparatus 3 under a plurality of the exposure amounts, as well as the initial electric potential before exposure and the electric potential after exposure per segment are measured, so that the exposure property of each segment, in other words, the property representing the relationship between the exposure amount and the electric potential after exposure (hereinafter referred to as "the measured exposure property") is revealed. The thick dashed graph g0 in FIG. 8(a) is an example of the exposure property revealed by the foregoing test.

As the method for measuring the exposure property of each of the segments, for example, a precise exposure property can be measured by exposing each of the segments as changing the exposure amount frequently and then measuring the electric potential after exposure. In addition, as shown in FIG. 8(a), since the exposure property has a certain tendency (curve shape) and can generally be formulated with the common formula by changing only the coefficient, the exposure property may be estimated based on the result of measuring electric potential exposed with one or more of the representative exposure amounts.

For example, since a-Si photoreceptor drum has the constant residual potential regardless of the position on the surface of the photoreceptor drums 1, the exposure property can be estimated in high accuracy by measuring the initial electric potential and the electric potential exposed with one exposure amount in the range of the approximate linear property.

The First Embodiment

The first embodiment of the present invention will hereinafter be described.

<The First Embodiment Employing the Individual Exposure Amount Control>

Hereinafter, as referring to the above-mentioned FIG. 8 and FIG. 3, the first embodiment of the individual exposure amount control will be described, as citing the example where a certain segment on the surface of a-Si photoreceptor drum 1 has the exposure property indicated in FIG. 8(a), in other words, the exposure property (g0) in which uneven electrification and uneven sensitivity coexist.

Figure 8:
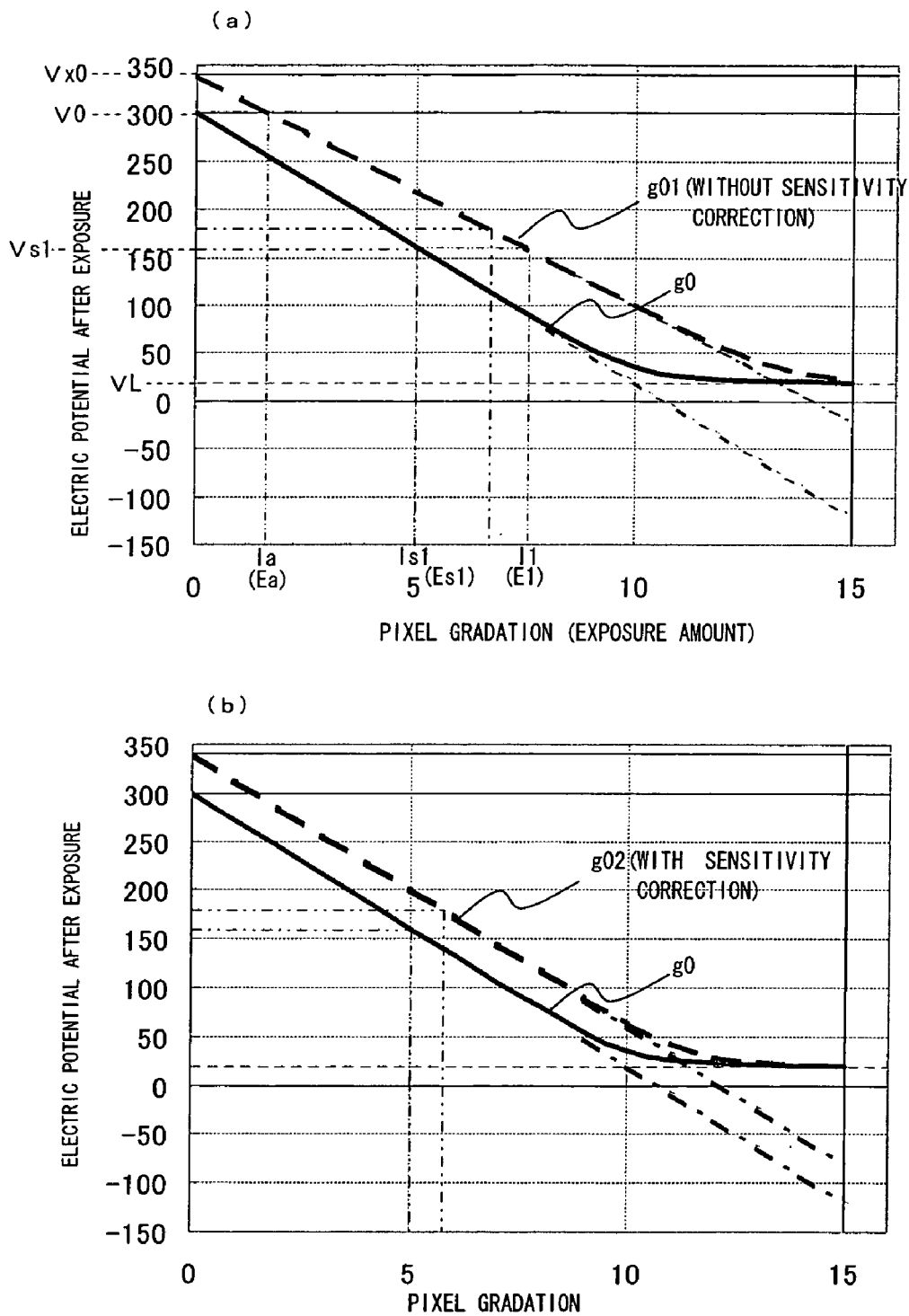
FIGS. 8 (*a*) and (*b*) are graphs showing one example of the conventional relationship between the pixel gradation and the electric potential after exposure on the surface of the photoreceptor in which both uneven electrification and uneven sensitivity coexist.

FIG. 3 (b) is a graph representing the first embodiment of the individual exposure amount control property (pixel gradation the exposure amount property) in regard to the segments having the exposure property indicated by the graph g01 in FIG. 8 (a), and FIG. 3 (a) is a graph showing the relationship between the pixel gradation and the electric potential after exposure when the individual exposure amount control is conducted according to the property of FIG. 3 (b).

The property indicated by dash-dotted line (E=k0·I, E: the exposure amount, I: pixel gradation, K0: slope) in FIG. 3 (b) represents the reference property (standard) of linear transformation (hereinafter, referred to as "the reference exposure amount transformation property") from the pixel gradation to the exposure amount, and the property indicated by the graph g0 and g01 in FIG. 8 (a) are the property of when the exposure is conducted at the exposure amount according to the reference exposure amount transformation property (slope=k0: y segment=0).

Also, the transformation property indicated by solid line in FIG. 3(b) (E=k0·I+Ea, E: the exposure amount, I: pixel gradation, k0: slope and Ea: the offset exposure amount) represents the property of the individual exposure amount control, and y segment Ea in the property is previously memorized in data memory unit 13 as the offset exposure amount per segment.

Moreover, the offset exposure amount Ea is, in the exposure property of the said segments (g01 in FIG. 8), the exposure amount Ea necessary to lower its electric potential only for the difference between the initial electric potential Vx0 and the reference initial electric potential V0 (Vx0−V0).

As shown in FIG. 3(b), the control member 10 controls, by executing the prescribed control program, the exposing source 2 (the first embodiment of the means for exposure amount control) so as to expose with the exposure amount added the offset exposure amount Ea (in other words, the exposure amount corresponding to the difference between the initial electric potential of the aforesaid segments and the reference initial electric potential) per segment in the range of all the pixel gradation including 0 gradation level comparing with the exposure amount obtained by linearly transforming the pixel gradation I determined by image processing unit 12 into the exposure amount E according to the reference exposure amount transformation property (the exposure Ei of pixel gradation i).

How the control of the exposure amount Ei which needs adjustment corresponding to the pixel gradation and the offset exposure amount Ea per segment, by control member 10 (one example of the means for the exposure amount control) is reflected to the control of the exposing source 2, will be described hereinafter.

When exposing source 2 is controlled by the foregoing individual exposure amount control, the electric potential property after exposure corresponding to the pixel gradation becomes as represented by the graph x1 in FIG. 3.

By the individual exposure amount control as shown in the graph gx1 in FIG. 3 (b), in other words, by controlling the exposure to be conducted at the exposure amount, offset with the expose amount Ea corresponding to the difference between the initial electric potential Vx0 and the reference initial electric potential V0 per segment, as shown in the graph gx1 in FIG. 3, in relation to the (electrified) photoreceptor having the uneven electrification, the property of the electric potential after exposure corresponding to the pixel gradation, overall approaches to the reference property g0 having the reference initial electric potential V0 for the initial electric potential, As a result, the fluctuation per position on the surface of the photoreceptor drums 1 can be avoided, and the occurrence of uneven density therefore can be minimized.

Figure 9:
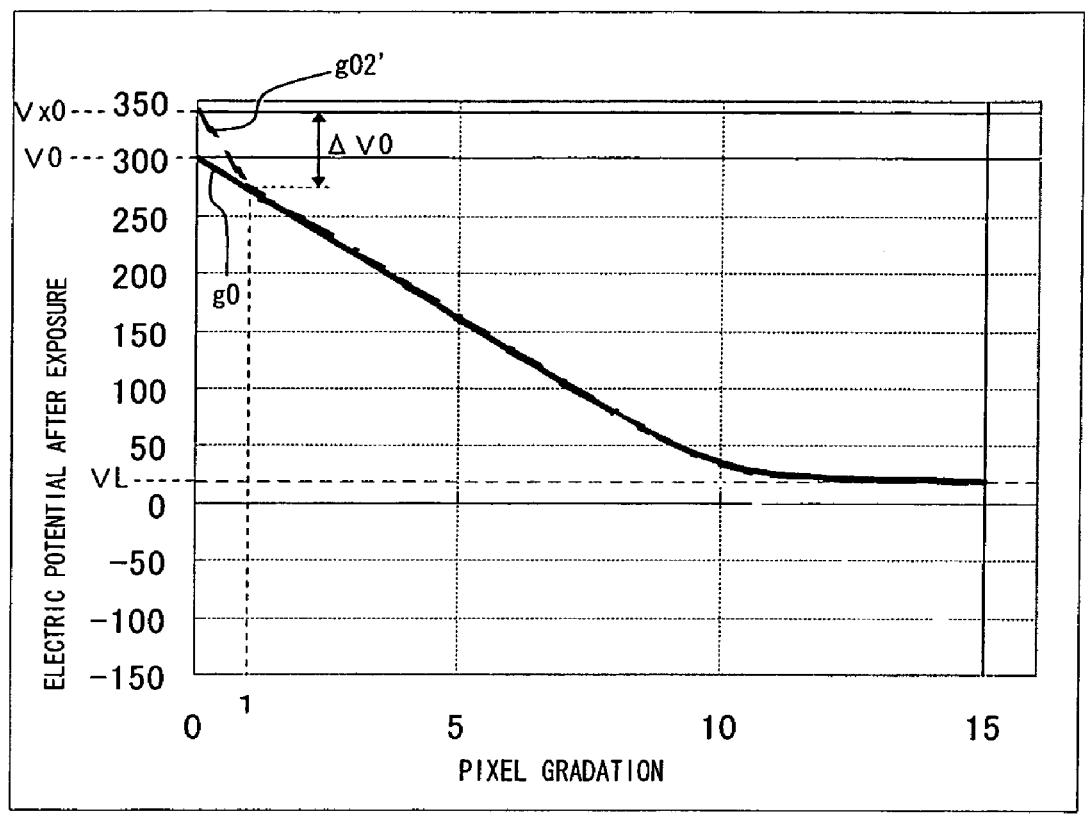
FIG. 9 is a graph of when exposing to the surface of the photoreceptor in which both uneven electrification and uneven sensitivity coexist, showing the relationship between the pixel gradation and the electric potential after exposure when the individual exposure amount transformation is conducted by setting all but 0 pixel gradations level respectively so that the electric potentials after exposure match with the reference property.

Moreover, since the pixel having 0 pixel gradation, not exposed in a conventional system, can also be exposed at the exposure amount offset Ea corrected (correction to the exposure amount after the approximate transformation), the gap (Δ V O in FIG. 9) between the exposed electric potential of when the pixel gradation level is 0, and that of when the pixel gradation level is 1, can be control to the minimum. As a result, the image quality is therefore not be degraded by inhibiting the continuity of halftone density.

Also, in the example shown in FIG. 3, although the exposure amount is controlled based on the offset exposure in all pixel gradation range including 0 gradation level, the exposure amount correction can be conducted only when the pixel gradation is within the certain range including 0 gradation level.

For example, within the property g01 in FIG. 8 (a), even if the exposure amount control is conducted based on the offset exposure amount only when the pixel gradation is the gradation within the rage showing the approximate linear property from 0 gradation level (in other words, the rage excluding the case that the electric potential after exposure is the residual potential and the neighborhood potential), the exposure property of each of the segments approximately matches with the reference exposure property. The foregoing feature can be applied to the following second embodiment of the individual exposure amount control.

<The Second Embodiment of the Individual Exposure Amount Control>

Hereinafter, as referring to the above-mentioned FIG. 8 and FIG. 4, the second embodiment of the individual exposure amount control will be described, as citing the example where a certain segment on the surface of a-Si photoreceptor drum 1 has the exposure property g0 indicated in FIG. 8(*a*).

FIG. 4 (*b*), as well as FIG. 3 (*b*), is a graph representing the second embodiment of the individual exposure amount control in regard to the segments having the exposure property indicated by the graph g01 in FIG. 8 (*a*), and FIG. 4 (*a*) is a graph showing the relationship between the pixel gradation and the electric potential after exposure when the individual exposure amount control is conducted according to the property of FIG. 3 (*b*).

Here, the property shown by the dash-dotted line in FIG. 4 (*a*) represents the same property shown by the dash-dotted line in FIG. 3 (*b*).

Also, the transformation property indicated by solid line in FIG. 3(*b*) ($E = k1 \cdot I + Ea$, in this regard, E: exposure amount, I: pixel gradation, k1: slope, Ea: the said offset exposure amount) has a property of the individual exposure amount control, and y segment Ea in the property is previously memorized in data memory unit 13 as the offset exposure amount per segment.

Also, k1 is, in regard to the segments, an slope information which defines the slope of when the pixel gradation is linearly transformed (including the transformations similar to linear transformation) into the said exposure amount, and which is previously memorized in the said data memory unit 13 per segment (an example of individual slope recording means).

Also, the offset exposure amount Ea is, as mentioned above, is the exposure amount Ea necessary to lower its electric potential only for the difference between the initial electric potential Vx0 and the reference initial electric potential V0 (Vx0−V0).

How to reflect exposure amount Ei needed to be adjusted corresponding to the pixel gradation, offset exposure amount Ea per segment and exposure amount Eki needed (required) to be adjusted corresponding to the slope information per segment to the control of exposing source 2 by control member 10 (one example of the means for the exposure amount control), will be described hereinafter.

As shown in FIG. 4 (*b*), the control member 10 controls, by implementing the prescribed control program, the exposing source 2 (the second embodiment of the exposure amount control means) so as to expose with the exposure amount added exposure amount Ea according to the amount of exposure, obtained by, in each of the said segments, linearly transforming the pixel gradation I determined by image processing unit 12 according to slope information k1 (in other words, the exposure amount corresponding to the difference between the initial electric potential and the reference initial electric potential in the said segments).

Since the slope fluctuation in the exposure property, in other words, the exposure property fluctuation caused by the uneven sensitivity is corrected in the case controlling the exposing source 2 by the foregoing individual exposure amount control, is corrected, the property of electric potential after exposure corresponding to the pixel gradation approximately matches with the reference property g0 as shown by the graph gx2 in FIG. 4 (*a*).

As a result, in regard to the photoreceptor drum 1 in which the uneven electrification and the uneven sensitivity coexist, the fluctuation in the electric potential after exposure per position on the surface of the photoreceptor can be almost eliminated, and the prevention of the uneven density of image therefore becomes more effective.

Now, as shown in FIG. 3 and FIG. 4, control member 10 controls the exposure means so as to expose with the offset exposure amount (Ei+Ea) added the offset exposure amount Ea (the exposure amount corresponding to the difference between the initial electric potential) per segment in the range of all the pixel gradation including 0 gradation level comparing with the exposure amount Ei obtained by linearly transforming the pixel gradation into the exposure amount.

Also, in the case further conducting the control based on slope information k1, the control is conducted as follows. The exposure amount by the exposure means is controlled to be exposure amount (Ei+Ea+Eki) added the offset exposure amount Ea and exposure amount for adjustment Eki based on slope information k1 to the foregoing exposure amount Ei.

[Example of the Case Conducting the Exposure Amount Control by the Adjustment of the Exposure Time]

Hereinafter, an example of the case conducting the exposure amount control by the adjustment of the exposure time will be described.

In the case conducting the individual exposure amount control indicated in FIG. 3 and FIG. 4, the exposure amount control by the control member 10 can be conducted as follows.

For example, in regard to the first embodiment represented in FIG. 3, it is contemplated that, combining the amount of exposure, which requires adjustment corresponding to the pixel gradation and the amount of exposure, which requires adjustment corresponding to offset exposure amount Ea, the exposure amount control by the control member 10 (one example of the exposure amount control means) is conducted by adjusting the exposure amount per pixel, by adjusting the exposure time per pixel by the exposing source 2 (the exposure means).

Also, in regard to the second embodiment indicated in FIG. 4, it is contemplated that, as well as the first embodiment, in regard to the combination of the amount of exposure, which requires adjustment corresponding to the pixel gradation and the amount of exposure, which requires adjustment corresponding to offset exposure amount Ea, the exposure amount control by the control member 10 (one example of the exposure amount control means) is conducted by adjusting the exposure amount per pixel, by adjusting the exposure time per pixel by the exposing source 2 (the exposure means).

On the other hand, in regard to the second embodiment, the adjustment (control) for the changing amount of the amount exposure, required per segment corresponding to the slope information, is considered to be conducted by adjusting the exposure intensity by controlling the power supply capability (in other words, "power modulation") to the luminous part by exposing source 2 (an example of the exposure control means).

In relation to the foregoing systems, more details will hereinafter be described referring to the embodiment of the exposure time control.

<The First Embodiment of the Exposure Time Control>

Next, the first embodiment of the exposure time control by control member 10, which is adoptable to the first and second embodiments of the exposure time control will be described.

Exposing source 2 equipped to image forming apparatus X, is the LED array-type exposure means in which one LED lump (luminous part) is arrayed per pixel in the main scanning direction.

Figure 5:
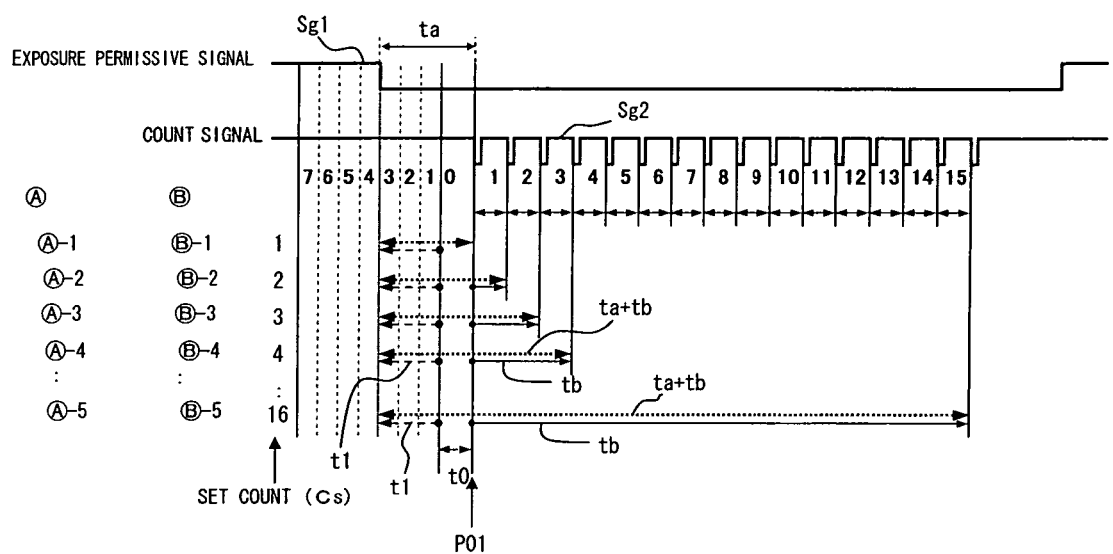
FIG. 5 is a time chart showing the first control example (the exposure time control) in the image forming apparatus X.

FIG. 5 shows a time chart describing the first embodiment of the exposure time control, by control member 10.

As shown in FIG. 5, from control member 10, per LED lump (in other words, "per pixel"), the prescribed exposure permissive signal Sg1, the count signal Sg2 generating the pulse signal once or continuously, and set count Cs, specifying the count of the change from ON to OFF in count signal Sg2 are inputted in exposing source 2.

Moreover, from control member 10, for each LED lump (for each pixel), the set exposure intensity specifying the luminous intensity (exposure intensity) is inputted in exposing source 2, and thereby conducting the exposure at the exposure intensity (luminous intensity) corresponding to the set exposure intensity by the function of the power supply capability adjustment member to LED lump equipped to exposing source 2. However, here, as matter of explanatory convenience, the set exposure intensity has been set at the previously specified constant intensity.

More specifically, the first embodiment of the said exposure control (example of not conducting the control based on slope information K1) will be described.

Then, exposing source 2 conducts exposure illuminating the LED lump, during the time from when exposure permissive signal Sg1 changes into the permissive state (change from ON to OFF) till when the change of count signal Sg2 from ON to OFF is generated for set count Cs (between ta+tb in FIG. 5).

In regard to the first embodiment of the exposure time control, to exposing source 2, control member 10 outputs count signal Sg2 having constant frequency of changing from ON to OFF and specifies (sets) a value added 1 to the pixel gradation (here, integer number from 1 to 15) as a value of set count Cs, as well as adjusts the time ta from when exposure permissive signal Sg1 changes into the permissive state (OFF) (generation of exposure start instruction) to the first change of exposure permissive signal Sg2 (from On to OFF, equivalent to the generation of the periodic signal) corresponding to offset exposure amount Ea (an example of the differential information). The above system adjusts the exposure time per pixel by exposing source 2.

Additionally, the change from ON to OFF of exposure permissive signal Sg1 is equivalent to the generation of the exposure start instruction, and the change to the number of change from ON to OFF of count signal Sg2 is equivalent to the generation of the periodic signal.

More concretely, when conducting exposure per pixel, control member 10 sets a value of the pixel gradation added 1 as set count Cs to exposing source 2, as well as transforms offset exposure amount Ea into the corrective gradation (for example, integers form 0 to 7) which is a index, proportional to the aforesaid value. FIG. 5 shows an example in case that the said corrective gradation level is 3 (+3).

Next, control member 10 turns, exposure permissive signal Sg1 outputted to exposing source 2, from ON to OFF, and then detects the time point where only the time t1 proportional to the corrective gradation, offset with the prescribed delay time t0 elapsed, as the reference time point P01. This detection of the reference time point 01 can be conducted, for example, such as by counting the number that the timing signal (not show) changing in a certain cycle, changes only "the number of times equivalent to the said corrective gradation+the number of times equivalent to the said delay time t0".

Here, if the timing signal and the count signal are signals having the same cycle generated based on the same clock signal, the circuit construction generating each signal can be simplified.

Figure 6:
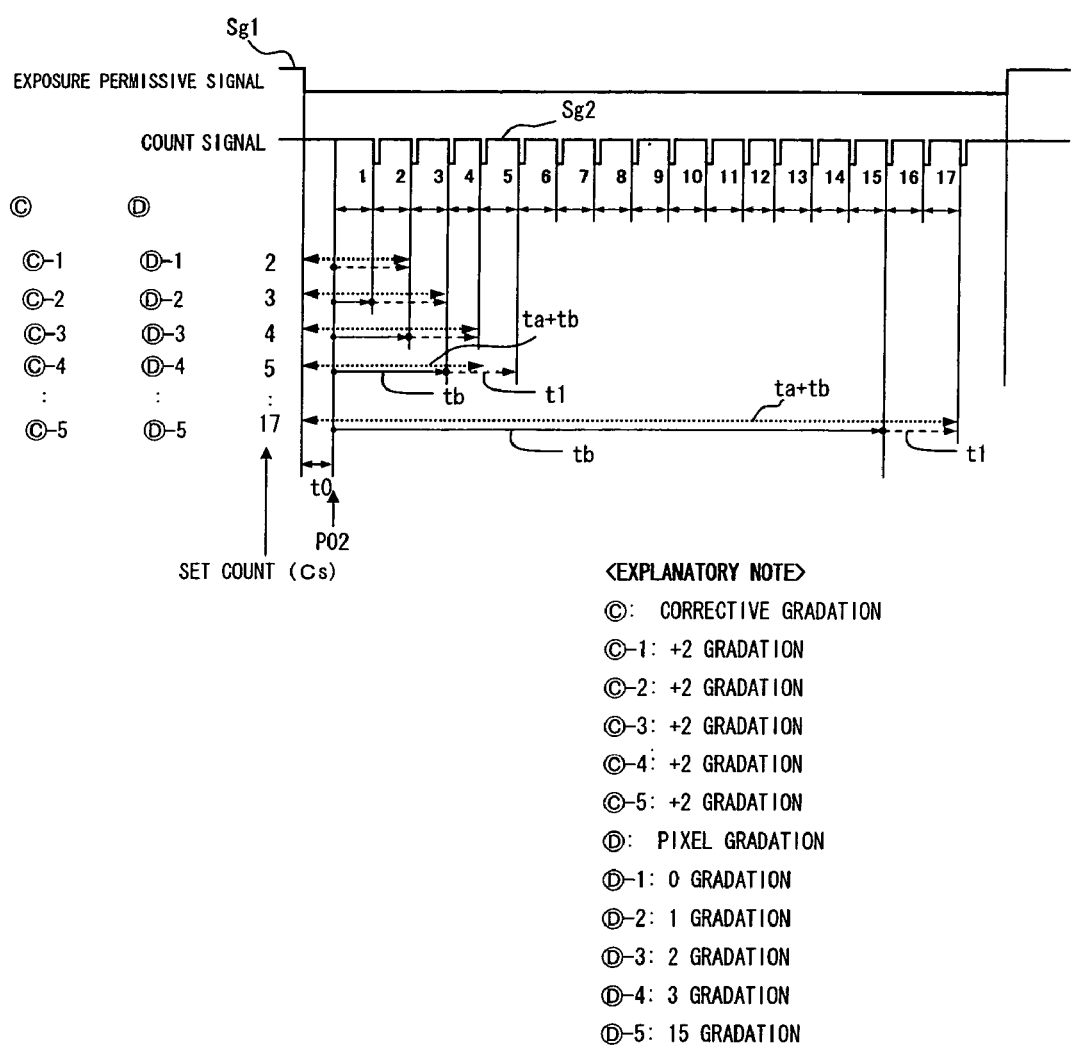
FIG. 6 is a time chart showing the second control example (the exposure time control) in the image forming apparatus X.
Figure 7:
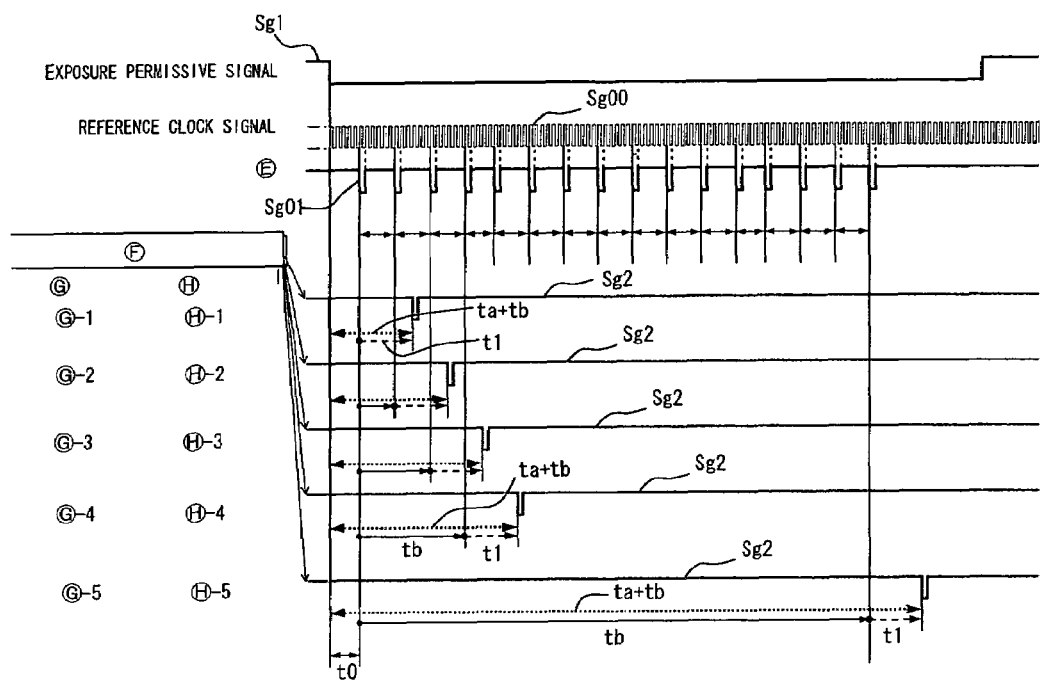
FIG. 7 is a time chart showing the third control example (the exposure time control) in the image forming apparatus X.

Additionally, the output signal Sg1 and Sg2 (control signal) to exposing source 2 indicated in the time charts in FIG. 5 and in after-mentioned FIG. 6 and FIG. 7 is generated by the pulse signal control circuit equipped in control member 10.

Next, control member 10 starts the change (ON→OFF) of count signal Sg2 at a certain cycle from the reference time point P01.

According to the above, the time ta from when exposure permissive signal Sg1 changes into the permissive state (generation of the exposure start instruction) to the first change of exposure permissive signal Sg2 (generation of the periodic signal) is adjusted corresponding to offset exposure amount Ea.

Then, according to the function of exposing source 2, the exposure is conducted only for the total time (ta+tb) of time ta, from when exposure permissive signal Sg1 changes into the permissive state till reference time point P01, and time tb (value of the pixel gradation×cycle of count signal Sg2), proportional to the pixel gradation from reference time point Sg2.

Here, delay time t0 is the time for compensating the loss from the launch of LED lump in exposing source 2 (due to the operation delay at the onset of illumination, the deficient exposure amount to the proper exposure amount), and the exposure amount of delay time t0 is regarded as 0(0) in this time charts. Therefore, he exposure time is practically (t1+tb).

As a result, as indicated in FIG. 3 (b), exposing source 2 is controlled to conduct the exposure per segment at the reference exposure amount obtained by the linear transformation of the pixel gradation (exposure amount during the time tb), offset with only the exposure amount corresponding to offset exposure amount Ea (exposure amount during the time t1).

Also, if as well as conducting the exposure time control such as indicated in FIG. 5, control member 10 controls the said set exposure intensity per segment to be the exposure intensity which is proportional to the said slope coefficient, it becomes the exposure amount control property shown in FIG. 4 (b).

However, in this case, even if offset exposure amount Ea is the same, it is necessary to adjust the said corrective gradation only for the amount equivalent to the change of the set exposure intensity.

<The Second Embodiment of the Exposure Time Control>

Next, the second embodiment of the exposure time control by the control member 10, which is adoptable to the first and second embodiment of the exposure time control, will be described.

The function of exposing source 2 in the second embodiment of this exposure time control is the same as the function of exposing source 2 in the first embodiment.

FIG. 6 shows a time chart describing the second embodiment of the exposure time control by the control member 10.

In regard to the second embodiment of the exposure time control, to exposing source 2, control member 10 outputs count signal Sg2 having constant frequency from ON to OFF, as well as specifies (sets) a value added with the value of the said corrective gradation (an example of value corresponding to the differential information) which is indicator proportional to offset exposure amount Ea (an example of the differential information) to a value added 1 to the pixel gradation (here, integer number from 1 to 15), as a value of the said set count Cs.

From this, the exposure time per pixel of exposing source 2 is adjusted.

More concretely, when conducting exposure per pixel, control member 10 converts offset exposure amount Ea into the corrective gradation (for example, integers form 0 to 7)

that is indicator proportional to offset exposure amount Ea. The example shown in FIG. 6 shows an example in the case where the corrective gradation is 2 (+2).

Moreover, control member 10 sets, to exposing source 2, the pixel gradation added 1, offset with the value of the said corrective gradation as a value of the said set count Cs.

Next, control member 10 turns the said exposure permissive signal Sg1 outputted to exposing source 2 from ON to OFF (generation of the exposure start instruction), and the time point where only delay time t0 elapsed from there (from the generation) is regarded as an reference time point P02. Then control member 10 changes count signal Sg2 (ON→OFF) at every time a certain time (cycle) form reference time point P02 elapses (at a certain cycle). This delay time t0 is the same as the delay time in the above-described first embodiment.

Accordingly, by the function of exposing source 2, the exposure is conducted practically only for time (ta+tb) equivalent to total time of time t1 corresponding to the said corrective gradation and time ta corresponding to the pixel gradation, from when exposure permissive signal Sg1 changes into the permissive state (generation of exposure start instruction).

As a result, the exposure amount control having the exposure amount control property as shown in FIG. 3 (b) is conducted.

Also, if as well as conducting the exposure time control as shown in FIG. 6, when control member 10 controls the set exposure intensity per segment to be the exposure intensity proportional to the slope coefficient, the exposure amount control property shown in FIG. 4 (b) will be obtained.

However, also in this case, even if offset exposure amount Ea is the same, the corrective gradation has to be adjusted for the amount equivalent to the change of the set exposure intensity.

<The Third Embodiment of the Exposure Time Control>

Next, the third embodiment of the exposure time control by the control member 10, which is adoptable to the first and second embodiment of the exposure time control will be described.

The function of exposing source 2 in the third embodiment of this exposure time control is the same as the function of exposing source 2 in the first embodiment.

FIG. 7 shows a time chart describing the third embodiment of the exposure time control by the control member 10.

In regard to the third embodiment of this exposure time control, when conducting the exposure per pixel, control member 10 set level 1 as set count Cs to exposing source 2.

From the above, exposing source 2 conducts the exposure during the time from when the change of exposure permissive signal Sg1 per pixel (ON→OFF, an example of the exposure start instruction) occurs till when the minimum change of count signal Sg2 (ON→OFF, an example of the exposure terminating instruction) occurs.

Moreover, after having exposure permissive signal Sg1 changed into the exposure permission state (OFF), control member 10 outputs count signal Sg2 which changes at the time point where the total time of delay time t0 from above change of signal Sg, the time t1 obtained from the conversion of offset exposure amount Ea into the exposure time, and time ta corresponding to the pixel gradation (t0+t1+ta) elapsed from the aforesaid change of signal Sg1.

According to the foregoing control of control member 10, the time from the change of exposure permissive signal Sg1 (generation of the exposure start instruction) to the change of count signal Sg2 (generation of the exposure terminating instruction) is adjusted, and thereby the exposure time per pixel is adjusted.

In the example shown in FIG. 7, exposure permissive signal Sg1 and count signal Sg2 are generated by control member 10 (the pulse signal control circuit of control member 10) as described below.

In other words, control member 10 changes exposure permissive signal Sg1 at the certain reference time point p02 (ON→OFF), in synchronization with the prescribed reference clock signal Sg00 that changes in the sufficiently short cycle (number of radiofrequency).

Moreover, control member 10 generates, the pixel gradation reference signal Sg01, where the change width of the exposure time corresponding to 1 level of gradation change of the pixel gradation is the change cycle, by dividing the said reference clock signal Sg00. At same time, the phase adjustment is conducted so that the time form the change of exposure permissive signal Sg1 (ON→OFF) to the first change of pixel gradation reference signal Sg01 (ON→OFF) becomes delay time t0.

Then, the control member 10 counts the number of changes of pixel gradation reference signal (ON→OFF) up to the number of value of the pixel gradation level 1+1, and from the point, further counts the number of changes of reference clock signal g00 up to the number proportional to offset exposure amount Ea (the example shown in FIG. 7 is 9 clock). Then, at that point, count signal Sg2 is changed by the control member 10.

Accordingly, the time from the change of exposure permissive signal Sg1 (generation of the exposure start instruction) to the change of count signal Sg2 (generation of the exposure terminating instruction) is adjusted, and then the exposure time per pixel is adjusted.

Also, as well as conducting the exposure time control such as indicated in FIG. 7, if control member 10 controls the set exposure intensity per segment to be the exposure intensity which is proportional to the slope coefficient, the exposure amount control property shown in FIG. 4 (b) will be obtained.

However, also in this case, if offset exposure amount Ea is the same, it is required to adjust the count of said reference clock signal {the count proportional to offset exposure amount Ea (equivalent to the 9 clock shown in FIG. 7)} for the amount equivalent to the change of the set exposure intensity.

Additionally, the above exposure amount control can also apply to the case a laser scanner is employed as exposing source 2.

[Example of the Case Conducting the Exposure Control by the Adjustment of the Exposure Intensity and Exposure Time]

Hereinafter, example of the case conducting the exposure control by the adjustment of the exposure intensity and exposure time will be described.

Also in this example, as shown in FIG. 3 and FIG. 4, control member 10 controls said exposure means to expose per segment at an exposure amount (Ei+Ea) offset only with offset exposure amount Ea (exposure amount corresponding to the difference in the initial electric potential) in the case where the gradation level exists in the whole range including 0 gradation, corresponding to the exposure amount Ei obtained by linearly transforming the pixel gradation into the exposure.

Also, in the case further conducting the control based on slope information k1, control member 10 controls said exposure means to expose at the exposure amount (Ei+Ea+Eki) further offset with the adjustment portion EKi of the exposure amount based on slope information K1.

At that time, control member 10 adjusts the exposure time by exposing source 2 (exposure means) based on either the pixel gradation or, both the pixel gradation and offset exposure amount Ea (an example of the differential information), and adjusts the exposure intensity based on offset exposure amount Ea (an example of the exposure amount control means).

Also, in the case conducting the control based on slope information K1, control member 10 adjusts the exposure intensity by exposing source 2 is adjusted per segment based on slope information K1 in addition to offset exposure amount Ea.

Hereafter, the embodiment of the exposure intensity and exposure time control will be described.

The First Embodiment of the Exposure Intensity and Exposure Time Control>

First, the first embodiment of the exposure intensity and exposure time control by exposing source 2 (hereinafter, referred to as "intensity·time control") conducted by implementing the certain control program by control member 10, will be described.

Figure 10:
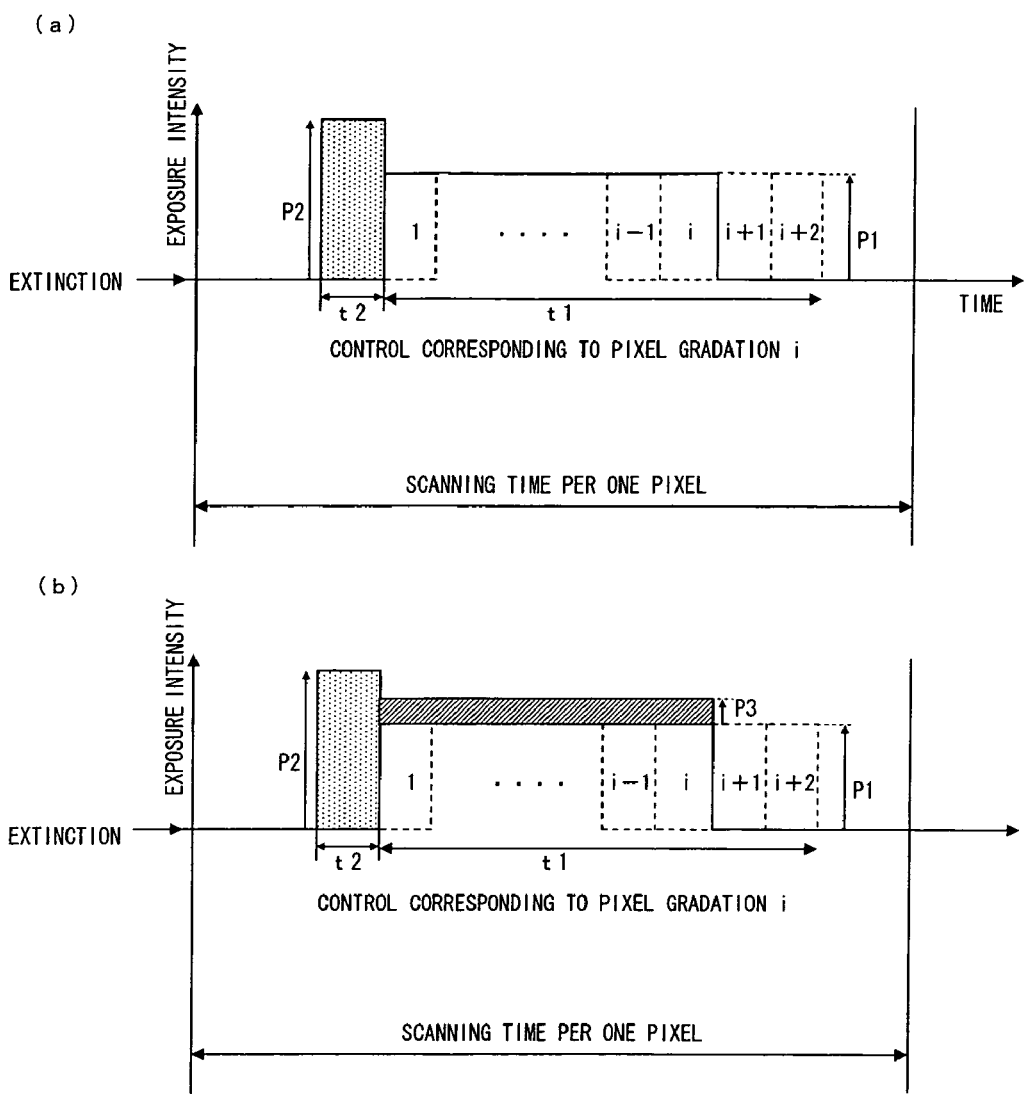
FIGS. 10 (*a*) and (*b*) are time charts showing the fourth control example (the exposure intensity and exposure time control) in the image forming apparatus X.

FIG. 10 is a time chart describing the first embodiment of the exposure intensity·time control. Here, FIG. 10 (a) and FIG. 10 (b) respectively shows examples in the case not conducting the control based on slope information K1 {equivalent to FIG. 3 (b)}. and in the case conducting the control based on the said slope information K1 {equivalent to FIG. 4 (b)}.

As shown in FIG. 10, in the present embodiment, the control member 10 conducts the exposure of offset exposure amount Ea by adjusting an exposure intensity P2 during the constant exposure time t1, and further conducts the exposure of an exposure amount Ei based on the pixel gradation by adjusting the exposure time t2 proportional to the pixel gradation i keeping an exposure intensity p1 constant (in other words, Ea=P2·t2, Ei=P1·t1). Here, exposure intensity P1 is the reference exposure intensity common between all pixels and also the exposure intensity P1 is the exposure intensity proportional to offset exposure amount Ea previously set per segment.

According to the above, the exposure time of exposures source 2 (exposure means) is adjusted based on the pixel gradation, and the exposure intensity in a certain period of time is adjusted based on offset exposure amount Ea. As a result, the exposure control according to a property shown in FIG. 3 (b) becomes possible.

Also, when further conducting the control based on slope information k1, the exposure amount adjustment according to an adjustment portion Eki of the exposure amount based on its slope information k1 (refer to FIG. 3 (b)) adjusted by exposing with the exposure intensity (P1+P3) corrected (offset) with only P3 corresponding to exposure intensity P1 employed when exposure is conducted according to the pixel gradation (in other words, P1+P3=P1·k1/k0).

Accordingly, in a certain period of time of the exposure of one pixel, the exposure intensity of exposing source 2 is adjusted per segment, also based on offset exposure amount Ea in addition to said slope information k1. As a result, the exposure control according to a property shown in FIG. 4 (b) becomes possible.

Also, in relation to the exposure based on offset exposure amount Ea, the said exposure time t2 can, for example, be changed sequentially (continuously) or in phases according to the size of offset exposure amount Ea, and then exposure intensity P2 can be set to keep (maintain) Ea=P2·t2. This is the example of adjusting the exposure time of exposing source 2 (exposure means) based on both on the pixel gradation and offset exposure amount Ea (an example of the differential information).

As described above, by individually conducting the exposure based on both the pixel gradation and the slope information and the exposure based on the offset exposure amount, at different time, the control becomes easy.

<The Second Embodiment of the Exposure Intensity and Exposure Time Control>

Next, the second embodiment of the exposure intensity and exposure time control by control member 10 will be described.

Figure 11:
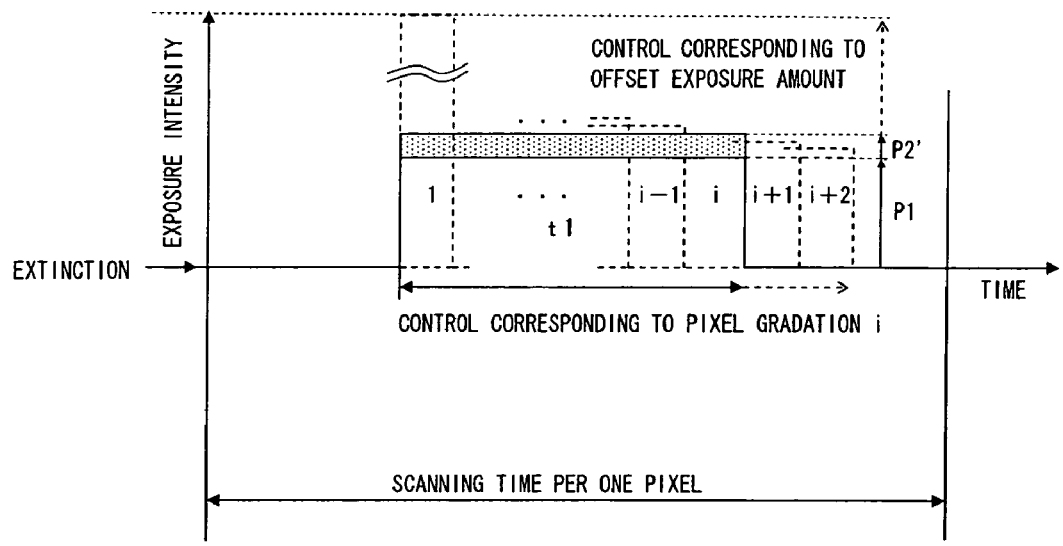
FIG. 11 is a time chart showing the fifth control example (the exposure intensity and exposure time control) in the image forming apparatus X.

FIG. 11 is a time chart that describes the second embodiment of the intensity·time of exposure control.

As shown in FIG. 11, in the present embodiment, the control member 10 controls the exposure means expose at exposure amount offset with the corrective exposure intensity P2' adjusted corresponding to offset exposure amount Ea and t1 (in other words, the pixel gradation) corresponding to the previously defined (set) reference exposure intensity P1 during exposure time t1 proportional to the pixel gradation i, excluding the case where the pixel gradation level is 0. Here, Ei=P1·t1, Ea=P2'·t1.

On the other hand, when the pixel gradation level is 0, as shown in FIG. 10, exposure intensity P2 and exposure time t2 are set to ensure offset exposure amount Ea (Ea=P2·t2). Here, it is contemplated that the exposure time t2 is the previously defined certain time or is variable corresponding to such as the size of offset exposure amount Ea.

Form the above, the exposure intensity becomes constant (=P1+P2') during the exposure for one pixel, and also the exposure amount control according to the property shown in FIG. 3 (b) becomes possible.

The foregoing control is suitable to the case having difficulties in changing the exposure intensity during the exposure for one pixel.

However, in this case, even if offset exposure amount Ea is the same, the different pixel gradation has the different exposure time t1, and therefore, the exposure intensity P2' needs to be set at each of the pixel gradation. (Ea=P2'·t1).

Also, when further conducting the control based on slope information k1, an adjustment portion Eki (refer to FIG. 3 (b)) of the exposure amount based on its slope information k1 is adjusted by exposing with the exposure intensity (P1+P2'+P3) corrected (offset) with only P3 (not shown) corresponding to the exposure intensity (P1+P2'), in the case where the pixel gradation is all but 0 gradation level same as shown in FIG. 10(b) (in other words, P1+P3=P1·k1/k0).

Accordingly, in the exposure for one pixel, the exposure intensity by exposing source 2 is adjusted per segment based on slope information k1 as well as offset exposure amount Ea. As a result, the exposure control according to the property shown in FIG. 4 (b) becomes possible.

<The Third Embodiment of the Exposure Intensity and Exposure Time Control>

Next, the third embodiment of the exposure intensity and exposure time control by exposing source 2 will be described.

Figure 12:
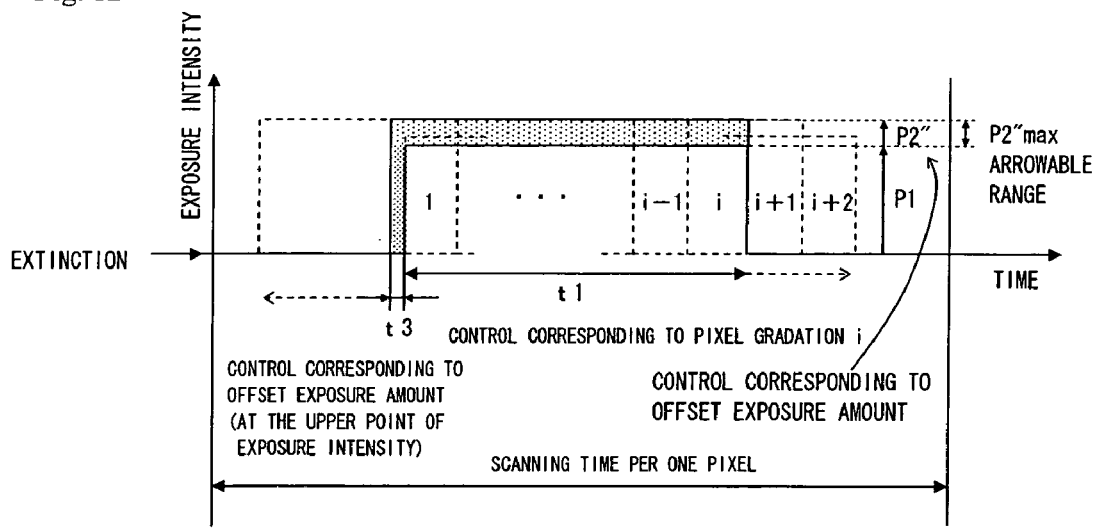
FIG. 12 is a time chart showing the sixth control example (the exposure intensity and exposure time control) in the image forming apparatus X.

FIG. 12 is a time chart that describes the third embodiment of the exposure intensity·time control of control member 10.

As shown in FIG. 12, in the present embodiment, control member 10 keeps the exposure intensity constant (=P1+P2") during the exposure of one pixel.

Here, in regard to the control of offset exposure amount Ea (an example of the exposure amount based on the differential information), in the case where the pixel gradation level is all but 0, control member 10 conducts the adjustment of exposure intensity P2" within the prescribed permissive rage (0 to P2" max) per exposure of one pixel, and then adjusts the deficient exposure amount by adjusting the exposure time t3 even if the adjustment of the exposure intensity P2" within the permissive range is conducted. Hence, Eki=P1·t2, Ea=P2"·t2+(P1+P2")·t3 (here, 0≦P2"≦P2" max, and t3E=0 within the range of Ea≦P2" max·t2).

At the same time, in the case where the pixel gradation level is 0, exposure intensity P2 and exposure time t2 are set to ensure offset exposure amount Ea as shown in FIG. 10 (Ea=P2·t2), but not shown in FIG. 12. In this case, exposure time t2 is variable corresponding to such as the size of said offset exposure amount, and P2 is controlled not to exceed the permissive upper limit (P1+P2" max).

The above system allows the exposure amount control according to the property as shown in FIG. 3 (b).

The foresaid control is suitable to the case having difficulties in changing the exposure intensity during the exposure at one pixel.

Also, since the exposure intensity is adjusted in a range within the upper limit (P1+P2" max), the overgrown adjustment range of the exposure intensity is prevented from rather degrading the image quality, and/or the exposure intensity by exposing source 2 is prevented from exceeding the adjustable range.

Also, when further conducting the control based on slope information k1, according to an adjustment portion Eki of the exposure amount based on its slope information k1 (refer to FIG. 3 (b)) same as shown in FIG. 10(b), the exposure amount by exposure member is adjusted exposing with the exposure intensity (P1+P2"+P3') corrected (offset) with only P3' (not shown) corresponding to the exposure intensity (P1+P2"). In other words, in the case where the pixel gradation level is but 0, P1+P3'=P1·t1·(k1/k0)/(t1+t3).

Accordingly, in the exposure of one pixel, the exposure intensity by exposing source 2 is adjusted based on said slope information k1 as well as offset exposure amount Ea. As a result, the exposure control according to the property shown in FIG. 4(b) becomes possible.

Next, as referring to the time chart in FIG. 13, the function of exposing source 2 will be described.

Exposing source 2 equipped to the present image forming apparatus X is the LED array-type exposure means in which one LED lump (luminous part) is arranged per pixel in the main scanning direction.

Figure 13:
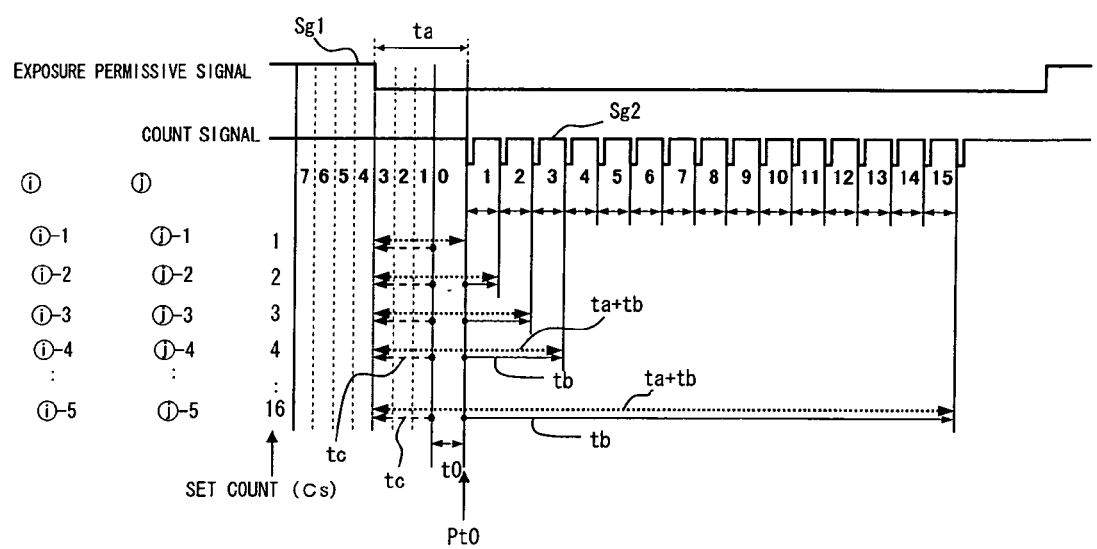
FIG. 13 is a time chart explaining the function of the exposing source in the image forming apparatus (X)

As shown in FIG. 13, from control member 10, the prescribed exposure permissive signal Sg1, a count signal Sg2 generating the pulse signal either once or continuously (a count signal Sg2 where the pulse signal is generated either once or continuously), and a set count Cs specifying the count of change from ON to OFF in count signal Sg2 are inputted per LED lump (in other words, "per pixel") in exposing source 2.

Moreover, from control member 10, the set exposure intensity specifying the luminous intensity (exposure intensity) is inputted per LED lump (in other words, "per pixel") in exposing source 2, and exposing source 2 conducts exposure with the exposure intensity (luminous intensity) corresponding to the set exposure intensity by the function of the adjustment member of power supply capability to LED lump equipped to said exposing source 2. According to the set exposure intensity, the above described exposure intensity P1, P2, (P1+P3), (P1+P2'), (P1+P2") are adjusted.

Then, exposing source 2 conducts exposure illuminating the LED lump, during the time from when exposure permissive signal Sg1 changes into the permissive state (change from ON to OFF) till when the change from ON to OFF of count signal Sg2 is generated for set count Cs (during ta+tb in the FIG. 13).

On the other hand, control member 10 outputs, to exposing source 2, count signal Sg2 which the cycle of the change from ON to OFF is constant, and specifies the pixel gradation level (here, integer number from 1 to 15) added 1 (value corresponding to the pixel gradation level) as a value of set count Cs. Furthermore, control member 10 adjusts exposure time t2 (FIG. 10) and t3 (FIG. 12) by adjusting time ta from when exposure permissive signal Sg1 changes into the permissive state (OFF) (generation of exposure start instruction) till when the first change of exposure permissive signal Sg2 (ON to OFF, generation of the periodic signal).

At same time, control member 10 changes exposure permissive signal Sg1 outputted to exposing source 2 from ON to OFF (generation of exposure start instruction), and detects the time point when a total time of the time tc equivalent to t2 or t3 (exposure time) and prescribed delay time t0 elapsed form the generation of the exposure start instruction, as a reference time Pt0. Reference time point Pt0 is detected, for example, such as by counting the timing signal (not shown) changing at a constant frequency.

At same time, exposure time t1 (refer to FIG. 10 to FIG. 12) is adjusted by adjusting set count Cs.

Here, delay time t0 is the time for compensating the loss of exposure amount from the launch of LED lump in exposing source 2 (the deficient exposure amount to the proper exposure amount due to the operational delay at the start of illumination), the exposure amount of delay time t0 is regarded as 0 (0) in these time charts. Therefore, the exposure time is substantially (tc+tb).

The foregoing exposing source 2 allows the said exposure intensity·time control.

The above may apply to the case when a laser scanner is employed as exposing source 2.

<The Fourth Embodiment of the Exposure Intensity and Exposure Time Control>

Next, the fourth embodiment of the exposure intensity and exposure time control by the control member 10 will be described.

In the fourth embodiment, control member 10 controls the exposure by exposing source 2 separating a exposure time zone with a time when the exposure equivalent to a exposure amount Eki obtained by transforming the pixel gradation into the amount of exposure (hereinafter, referred to as "exposure for image formation), and a time when the exposure equivalent to exposure amount Ea offset according to the offset exposure amount (one example of the differential information), per segment, as well as controls exposing source 2 to conduct the exposure equivalent to offset amount exposure Ea, per segment by dividing into multiple positions (one example of the exposure amount control means) in each segment.

Also, when even conducting the control based on slope information k1, the exposure intensity by exposing source 2 is adjusted based on slope information k1 as well as offset exposure amount Ea.

Figure 14:
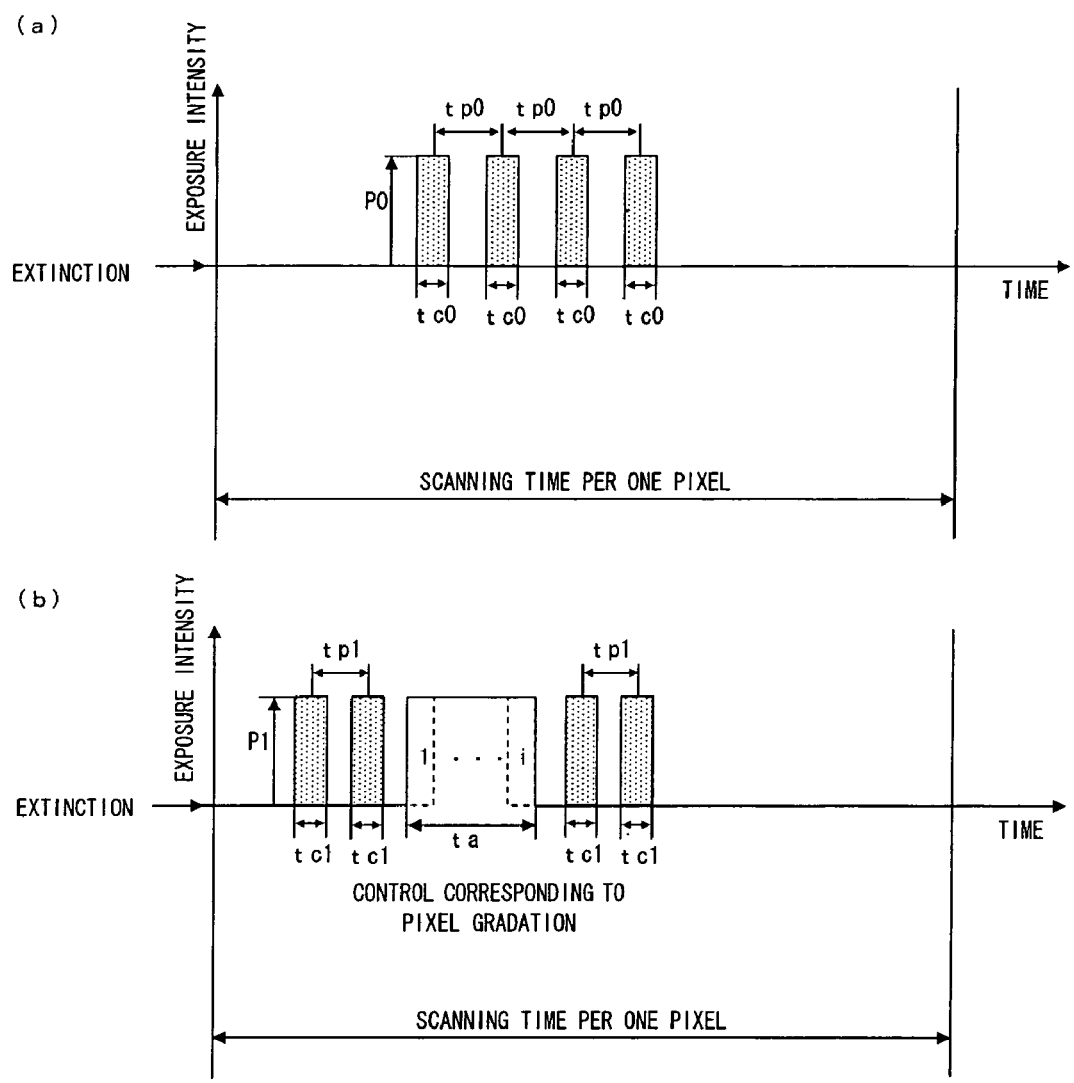
FIGS. 14 (a) and 14 (b) are time charts showing a frame format of the seventh control example (example of the exposure timing of the exposure for image formation and the exposure for offset) in the image forming apparatus X.

FIG. 14 is a time chart showing an example of the exposure timing of the exposure for image formation and the exposure for exposure amount offset in the fourth embodiment of the exposure intensity and exposure time control. Here, FIG. 14 (a) shows the exposure timing for the pixel where the pixel gradation level is 0, and FIG. 14 (b) shows the exposure timing for the pixel where the pixel gradation level is 1 or more.

The horizontal axis in the time charts in FIGS. 14 (a) and (b) represent the scanning time of when the illuminating radiation by exposing source 2 scans the surface of photoreceptor drum 1 in the circumferential direction (sub scanning direction). Here, since the scanning speed is constant, the abscissa axis in the time charts in FIG. 14 is equivalent to the exposure position in the circumferential direction (sub scanning direction) on the surface of photoreceptor drum 1.

As shown in FIG. 14, at least in regard to the pixel where the pixel gradation level is 0, in other words, the pixel where the exposure for image formation is not conducted, control member 10 controls the exposure source 2 on such manner as the exposure for offset is conducted at interval of the prescribed time pitch tp0, in several times (FIG. 14 (a) show the example of four times) during the time tg that the illuminating radiation by exposing source 2 scans the region of one pixel on the surface of photoreceptor drum 1 (time period tc0 in the Fig.). According to the above, the exposure for offset is conducted per each pixel in several portions at interval of the spacing pitch (exposing pitch) equivalent to the time pitch tp0 in the circumferential direction on the photoreceptor drums 1. The exposing pitch equivalent to this time pitch tp0 is, for example, preferred to be equal to or less than two-third of the illuminating radiation beam diameter of exposing source 2. The reason will hereinafter be described.

Also, the exposure intensity of the exposure for offset P0 is maintained constant, and the sum of exposure time {4·tc0 in the case of FIG. 14 (a)} is adjusted in proportion to offset exposure amount Ea, i.e. (sum of tc0)=Ea/P0.

On the other hand, as shown in FIG. 14, control member 10 conducts by exposure source 2, in regard to the pixel where the pixel gradation level is 1 or more than 1 (1 to 15 gradation), the exposure for offset (time period of tc1 in the Fig.) at least divided into before and after the time period ta of the exposure for image formation (the exposure equivalent to the exposure amount obtained by the approximate linear transformation of pixel gradation into exposure amount) {the exposure equivalent to the exposure amount offset corresponding to the offset exposure amount (one example of the differential information)}. According to the above construction, in regard to the pixel where the pixel gradation level is 1 or more than 1, the exposure for offset is conducted at lease at multiple positions surrounding the exposure position of the exposure for image formation. Also, the respective exposures before and after the exposure for image formation are conducted further divided into multiple positions corresponding to the size of offset exposure amount Ea.

Also, the exposure intensity of the exposure for offset P1 is maintained constant, and the sum of exposure time {4·tc1 in the case of FIG. 14 (b)} is adjusted in proportion to offset exposure amount Ea, i.e. (sum of tc1)=Ea/P1.

FIG. 14 (b) shows an example that the exposure is conducted further divided into two positions before and after the exposure for image formation. The spacing pitch (exposing pitch) is a pitch equivalent to the time pitch tp1. This exposing pitch equivalent to this time pitch tp1 is also, as far as possible, preferred to be equal to or less than two-third of the illuminating radiation beam diameter of exposing source 2.

Here, the exposure time as whole becomes longer as the number of positions multi-divided in the exposure for offset increases. In response, since the time of the exposure for image formation ta is zero in the case where the pixel gradation level is 0, it is capable of dividing the exposure for offset into a relatively large number of portions (degree of the adjustment freedom is high). On the other hand, when the time of the exposure for image formation ta is long (in other words, value of the pixel gradation level is large), the number of positions multi-divided in the exposure for offset is limited in regard to the rest of the time period per pixel (in other words, "residual position"). Hence, within its limited range, as far as possible, the exposing pitch corresponding to the time pitch tp1 is specified equal to or less than two-third of the illuminating radiation beam diameter of exposing source 2.

Also, the exposure time of the exposure for image formation ta is proportional to the value of the pixel gradation level.

Here, when the exposure amount control based on slope information K1 is not conducted, the exposure intensity (vertical axis in FIG. 14) stays constant in all pixels.

On the other hand, when the exposure amount control based on slope information K1 is also conducted, adjusted portion of the exposure amount Eki {referrer to FIG. 3(b)} is adjusted by correcting the exposure intensity of when conducting the exposure for image formation (exposure corresponding to the pixel gradation level, time period ta) in proportion to the ratio of slope information K1 to reference slope K0. In other words, when the reference exposure intensity (exposure intensity of when the slope is K0) is represented by P1 and the exposure intensity after correction is represented by P2, P2=P1·k1/k0.

Accordingly, the exposure amount adjustment based on the slope information K1 will be conducted.

The control of exposing source 2 as described above allows the exposure intensity·time control, which can obtain the control property indicated in FIG. 3 (b) or FIG. 4 (b).

Also, the above exposure control may apply to the case when a laser scanner is employed as the exposing source 2.

Here, as referring to FIG. 15 and FIG. 16, the relationship between the exposing pitch and the electric potential after exposure under the condition that the exposure amount stays constant will be described.

Figure 15:
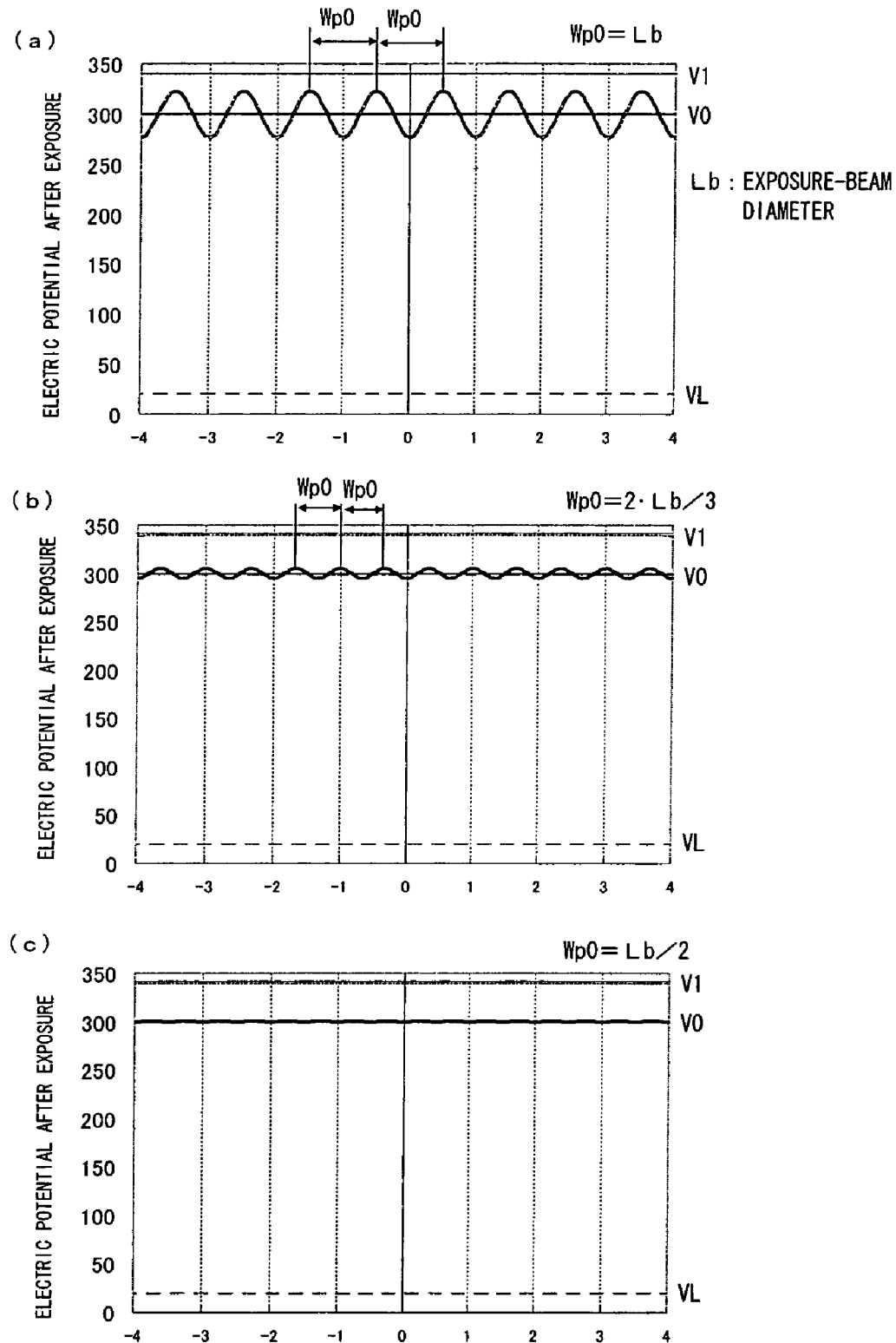
FIGS. 15 (a), 15(b) and 15 (c) are the graphs showing, under the condition that the exposure amount stays constant, the relationship between the exposure pitch and the electric potential after exposure.
Figure 16:
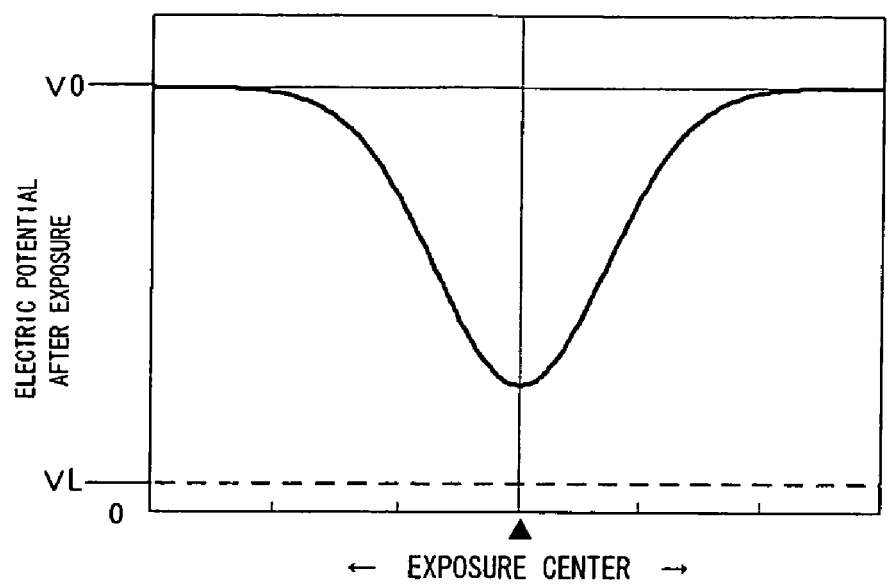
FIG. 16 is a figure showing the electric potential distribution in the vicinity of (near) exposure center.

FIG. 15 is a diagram shows the electric potential distribution in the vicinity of the exposure center on the surface of the photoreceptor drum 1 after exposure by the light source of the prescribed beam diameter.

Additionally, the exposure beam diameter, which slightly changes corresponding to the exposure intensity, is here based on the beam diameter in the case where the exposure intensity is set at 13.5 percent of the generally employed maximum exposure intensity.

As shown in FIG. 15, when the surface of photoreceptor drum 1 electrified to the prescribed initial electric potential V0 is exposed, the electric potential after exposure falls (decreases) most at its exposure center and gradually increase along the prescribed curve with the distance from the exposure center.

According to the above, the relationship between the exposing pitch and the electric potential after exposure under the condition where the exposure amount stays constant becomes as shown in FIG. 15.

Here, FIGS. 15 (a), (b) and (c) respectively shows the case where the exposing pitch Wp0 is the same as the pitch of the beam diameter Lb of the illuminating radiation of exposing source 2, the case where exposing pitch Wp0 is two-third of beam diameter Lb and the case where exposing pitch Wp0 is half of beam diameter Lb. Also, (a), (b) and (c) are conditional on that the exposure amounts per unit exposure is proportional to the inverse (reciprocal) number of the exposing pitch, and accordingly the exposure amounts per unit area (unit length) are all the same.

As can be seen from FIGS. 15 (a), (b) and (c), when conducting the exposure of the certain exposure amount focusing (concentrating) on one place (spot), the relatively large electric potential distribution synchronized with the exposing pitch occurs {FIG. 15 (a)}, and its electric potential distribution will be smoothed and uniformed as the exposing pitch gets smaller {FIGS. 15 (*b*) and (*c*)}.

Additionally, as shown in FIG. 15 (*b*), if exposing pitch is narrowed up to two-third of the beam diameter, it is understood that the electric potential distribution after exposure becomes sufficiently smooth. Accordingly, in order to sufficiently smooth the electric potential distribution after exposure, the exposing pitch is preferred to be equal to or less than two-third of exposing beam diameter.

In the above-mentioned embodiment, the segment specifies the region multi-divided in the surface of photoreceptor drums 1 in the axial direction and circumferential direction, but the segment is not limited to the region.

For example, when the uneven electrification and/or uneven sensitivity of either in the axial direction or in the circumferential direction in the surface of photoreceptor drum 1 mainly become(s) problems, the segment is considered to be the region multi-divided in photoreceptor drums 1 only in axial direction (the region sectionally divided in the surface of photoreceptor drum 1), or the region multi-divided in photoreceptor drums 1 only in circumferential direction.

Also, in the embodiments and the practical examples, offset exposure amount Ea is indicated as the differential information corresponding to the reference initial electric potential per segment of the initial electric potential and the slope itself of when transforming the pixel gradation into the exposure amount is indicated as the slope information in the examples, it is not limited to those. For example, any other information, that can specifies those differential information and slope are also applicable. For example, the difference of the initial electric potential of each segment to the reference initial electric potential, or information of such as the value of the pixel gradation converted (transformed) previously from the aforesaid difference to the aforesaid corrected pixel gradation can be previously memorized in data memory unit 13 as the differential information.

In the same way, the able of the transformation from the pixel gradation to the exposure amount, or such as the coordinate information that specifies the slope regarding the coordinate system consists of the pixel gradation axial and the exposure amount axial can be previously memorized in data memory unit 13 as the slope information.

Also, in the embodiments and the practical examples, image forming apparatus X where offset exposure amount Ea or/and the slope information is/are memorized in data memory unit 13 is represented, the image forming apparatus comprising the means to calculate offset exposure amount Ea (one example of the differential information) and/or the slope information.

For example, an image forming apparatus, which is comprised to previously memorize the information related to exposure property for each of the segment of the photoreceptor drum 1 placed in image forming apparatus X, as well as the information related to reference exposure property common between all segments, in data memory unit 13, and based upon said memorized information, calculate offset exposure amount Ea and/or slope information k1 by established means, and then conduct the above-mentioned exposure amount control based upon the calculated result, can be included. In this case, the information related to the exposure property for each of the segments can be regarded as the basic information including the differential information or/and the slope information.

From the above, in manufacturing phase of the image forming apparatus, calculation and memorizing of the offset exposure amount or the slope information for respective apparatuses can be omitted.

Next, as referring to the block diagram shown in FIG. 17, the second example of a schematic structure of the main part of an image forming apparatus X will be described.

Image forming apparatus X according to the second embodiment comprise the hereinafter-described corrective image processing unit 15 conducting image processing based on differential information described later in addition to the components shown in FIG. 2 (electrification apparatus 3, exposing source 2, developing apparatus 5, neutralizing apparatus 4, control member 10, display operation member 11, image processing unit 12, data memory unit 13 and rotational position detecting member 14).

Memory unit 13 previously memorizes, for each of the segments multi-divided in the surface of the respective photoreceptor drums 1, consisting of regions for a plurality of pixels, the differential information for specifying the difference between the exposure property representing the correspondence between the average exposure amount and electric potential after exposure of all the segments {for example, property shown by the graph g01 in FIG. 8(*a*)} and the reference property common between all the segments {for example, property shown by the graph g0 in FIG. 8(*a*)}(one example of differential information recording means).

Here, regarding the segment, for example, such as the region having the same number of pixels in the vertical direction (sub scanning direction) and horizontal direction (main scanning direction) between the aforesaid segments and unit pixel group employed for the image processing in the area coverage modulation method in image processing unit 12.

Corrective image processing unit 15 obtains the hereinafter-described corrective pixel & gradation information by conducting the image processing according to the area coverage modulation method based on the differential information.

Also, in the exposure time control of exposing source 2 by control member 10, the exposure time is set to the time proportional to the pixel gradation. By this setting the exposure would be conducted at the exposure amount proportional to the pixel gradation as long as the exposure intensity is maintained constant.

The other functions (operation, actions) of each component are identical with the functions (operations, actions) of each component indicated in the block diagram of FIG. 2.

[The First Embodiment of the Differential Information]

Hereinafter, as referring to FIG. 8 and FIG. 18, the first embodiment will be described, as citing the example where the average exposure property of a certain segment on the surface of a-Si photoreceptor dram 1 is the exposure property indicated in FIG. 8 (*a*), in other words, the exposure property (g0) in which uneven electrification and uneven sensitivity coexist.

Here, FIG. 18(*b*) is, in regard to the segment having the exposure property indicated in the graph g01 in FIG. 8 (*a*), a graph showing the correspondence between the average of the pixel gradation determined by image processing unit 12 based on image data (hereinafter, referred to as "pixel gradation average" or "original pixel gradation average") and the average of the pixel gradation after having corrected the aforementioned average based on the first embodiment of the differential information (hereinafter, referred to as "corrected pixel gradation average"). FIG. 18(*a*) is a graph showing the relationship between the original pixel gradation average when conducting exposure at the exposure amount obtained by proportionally converting the corrected pixel gradation average indicated in FIG. 18(*b*) and the electric potential after exposure (exposed electric potential).

Here, the dash-dotted line indicated in FIG. 18 shows a correspondence between pixel gradation average and corrective pixel gradation average in the case where the original pixel gradation average I ave is equal to the corrected pixel gradation average Ix (Ix=Iave), in other words, in the case where not conducting the correction. In addition, the properties indicated by the graph g0 and g01 in FIG. 8(*a*) are the properties of when the exposure is conducted in order that the average exposure amount in the segments is the exposure amount obtained by the direct proportional conversion of the original pixel gradation average, without directly correcting the original pixel gradation average.

Also, the full line indicated in FIG. 18 (*b*) shows the correspondence between original pixel gradation average Iave and corrected pixel gradation average Ix {Ix=Iave+Ia, in this regard, Ia is a fixed number set for each segment. (hereinafter-described offset gradation)}. y segment Ia in this correspondence has been memorized in memory unit 13 as the offset gradation which is one example of the differential information per segment.

Here, offset gradation Ia is a value obtained by converting the difference {(Vx0−V0) [V]} between initial electric potential Vx0 in the average exposure property {graph g01 in FIG. (8)} of all the segments and initial electric potential V0 (reference initial electric potential) in the reference property {graph g0 in FIG. 8(*a*)} into the pixel gradation (one example of value corresponding to the differential).

In other words, offset pixel gradation Ia is, as shown in FIG. 8(*a*), a pixel gradation where the electric potential after exposure decreases only for the above-mentioned difference (Vx0−V0) when applying the exposure amount, obtained by the linear transformation of offset pixel gradation Ia based on the prescribed transform coefficient {coefficient common between all the segments (slope)}, to average exposure property g01 of all the segments.

Here, concretely how the pixel gradation and offset gradation I a (differential information) are reflected to the exposure amount control of each pixel by control member 10 (one example of the means for the exposure amount control), will be described hereinafter. Here, the graph gx1 shown in FIG. 18 (*a*) represents a property of electric potential after exposure corresponding to the pixel gradation average of when exposure is conducted in each segment with exposure amount obtained by setting the exposure amount of average at exposure amount hereinafter described.

The exposure amount of average is the one offset (added) exposure amount equivalent to offset gradation level Ia corresponding to the exposure amount proportional to the pixel gradation average.

As shown by the graph gx1 in FIG. 18 (*a*), in the photoreceptor in which the uneven electrification exists (the electrified photoreceptor), the property of electric potential after exposure to the pixel gradation average overall approximately approaches to reference property g0 where reference initial electric potential V0 is the initial electric potential. As a result, the fluctuations in the exposed electric potentials in each position on the surface of the photoreceptor 1 can be inhibited, and the occurrence of uneven density therefore can be minimized.

Moreover, since the pixel having 0 pixel gradation level, not exposed in conventional system, is also exposed at the exposure amount equivalent to offset pixel gradation I a corresponding to the difference in the initial electric potential, the gap (A V0 in FIG. 9) between the exposed electric potential of when the pixel gradation level is 0, and that of when the pixel gradation level is 1, can be control to the minimum. As a result, the image quality is therefore not be degraded by inhibiting the continuity of halftone density.

Additionally, in the example indicated in FIG. 8(*a*), the correction based on offset pixel gradation Ia is conducted in the case where the pixel gradation average is within the whole range including 0 gradation level, but the correction based on offset pixel gradation Ia can be conducted only in the case the pixel gradation level is within the partial range including 0 gradation level.

For example, among properties g01 indicated in FIG. 8 (*a*), only when the pixel gradation average is the gradation level within the range showing the approximate linear property including 0 gradation level (in other words, range excluding the case where the electric potential is after exposure the residual electric potential and the neighborhood electric potential), even the exposure amount control, offsetting the exposure amount equivalent to offset gradation Ia, is conducted, the exposure property in respective the segments approximately matches with the reference exposure property.

[The Second Embodiment of the Differential Information]

Hereinafter, as referring to FIG. 8 and FIG. 18, the second embodiment of the differential information will be described, as citing the example where the average exposure property of a certain segment on the surface of a-Si photoreceptor dram 1 is the exposure property indicated in FIG. 8 (*a*), in other words, the exposure property (g0) in which uneven electrification and uneven sensitivity coexist.

Here, FIG. 19(*b*) is, as well as FIG. 18 (*b*), in regard to the segment having the exposure property indicated in the graph g01 in FIG. 8(*a*), a graph showing the correspondence between the original pixel gradation average and the corrected pixel gradation average that said average is corrected based on the second embodiment of the differential information. FIG. 19(*a*) is a graph showing the relationship between the original pixel gradation average when conducting exposure at the exposure amount obtained by proportionally converting the corrected pixel gradation average indicated in FIG. 19(*b*) and the electric potential after exposure (exposed electric potential).

Here, the dash-dotted line in FIG. 19(*b*) indicates the same property indicated by the dash-doted lien in FIG. 18(*b*).

Also, the full line indicated in FIG. 18 (*b*) shows the correspondence between original pixel gradation average Iave and corrected pixel gradation average Ix (Ix=k1·Iave+Ia, in this regard, k1 is a slope and Ia is the offset gradation). k1 is, in regard to the respective segments, a slope information which defines the slope of when the original pixel gradation is linearly transformed into the corrected pixel gradation.

Offset gradation Ia and slope information k1 in this correspondence have been memorized per segment in memory unit 13 as one example of the differential information.

Here, concretely how the pixel gradation and offset gradation I a (differential information) and differential information k1 (the differential information) are reflected to the exposure amount control of each pixel by control member 10 (one example of the means for the exposure amount control), will be described hereinafter. Here, the graph gx2 shown in FIG. 19 (*a*) represents a property of electric potential after exposure corresponding to the pixel gradation average of when exposure is conducted in each segment with exposure amount obtained by setting the exposure amount of average at exposure amount hereinafter described.

The exposure amount of average is the one offset (added) exposure amount equivalent to a gradation (Ia+Iki) corresponding to the exposure amount proportional to the pixel gradation average.

Moreover, above described gradation (Ia+Iki) is a gradation equivalent to a total value of offset gradation Ia and corrective gradation Iki {=Iave·(k1−1)}.

As shown by the graph gx2 in FIG. 19 (*a*), in the photoreceptor in which the uneven electrification and the uneven sensitivity coexist (the electrified photoreceptor), since the slop fluctuation in the exposure property, in other words, the fluctuation of the exposure property caused by the uneven sensitivity is corrected as well as the fluctuation of the initial electric potential (uneven certification), the property of electric potential after exposure to the pixel gradation average approximately matches with reference property g0. As a result, the fluctuations in the exposed electric potentials in each position on the surface of the photoreceptor 1 can be approximately inhibited, and the occurrence of uneven density therefore can be more minimized.

Next, how to reflect the differential information (offset gradation Ia and/or slope information k1) to the exposure amount control of each pixel, will be described.

In image forming apparatus X, before conducting the image processing based on the image data, the corrective image processing 15 determines the corrective pixel & gradation information which represents the array of the target pixels for correction and the corrective gradation of the pixel gradation employing the respective target pixels for correction, by conducting the image processing in the area coverage method per segment based on the differential information. (one example of the means for determination of the corrective pixel & gradation information).

In general, in the image processing employing the area coverage method, if the set value of the density gradation in the whole unit pixel groups (hereinafter, referred to as "set density gradation") is provided to each of the group of a plurality of pixel being a process unit (unit pixel group), the array of the pixel gradation is determined so that the average value of the pixel gradation of each pixel in the unit pixel group is determined to be the previously provided set density gradation and so that the drawing pixel is scattered. The determination rule is previously defined.

Accordingly, the respective segments of the unit pixel group of the image processing employing the area coverage method based on the differential information (processing of corrective image processing unit 15) and the respective segments are set to correspond to each other, and then the average corrective gradation level {Ia or (Ia+Iki)} in all the segments, is determined based on the differential information. Furthermore, if the corrective gradation level is provided as set density gradation, the array of the corrective gradation of each pixel based on the area coverage modulation method is determined so that the average value of the corrective gradation (equivalent to the pixel gradation) of each pixel in the segments becomes the corrective gradation level corresponding to the differential information. The array of corrective gradation determined by the above manner is the corrective pixel & gradation information (the target pixels for correction and the corrective gradation of each pixel).

For example, when determining the corrective pixel and gradation information based on offset gradation Ia, control member 10 provides offset gradation Ia to corrective image processing unit 15 as the set density gradation per segment. According to the above system, the corrective gradation of each pixel in the segment is determined so as to be dotted within the said segments. The array of corrective gradation determined by the above manner is the corrective pixel & gradation information, and the average value of the corrective gradation becomes offset gradation Ia.

Also, when determining the corrective pixel & gradation information based on offset gradation Ia and slope information k1, first, control member 10 calculates the average value Iave of the pixel gradation in all the pixels within the segment and then further acculturates gradation correction portion Iki (=Iave·(k1−1)) based on slope information k1.

Next, control member 10 provides the gradation (Ia+Iki), offset with offset gradation Ia and corrective gradation Ik1 based on slope information k1 to corrective image processing unit
as the set density gradation. From the above, the corrective gradation of each pixel in the segments is determined so as to be scattered in the segments, and the average of said corrective gradation becomes (Ia+Iki).

Hereinafter, the overall corrective gradation {Ia or (Ia+Iki)} based on the differential information in each segment is referred to as the average corrective gradation.

Figure 20:
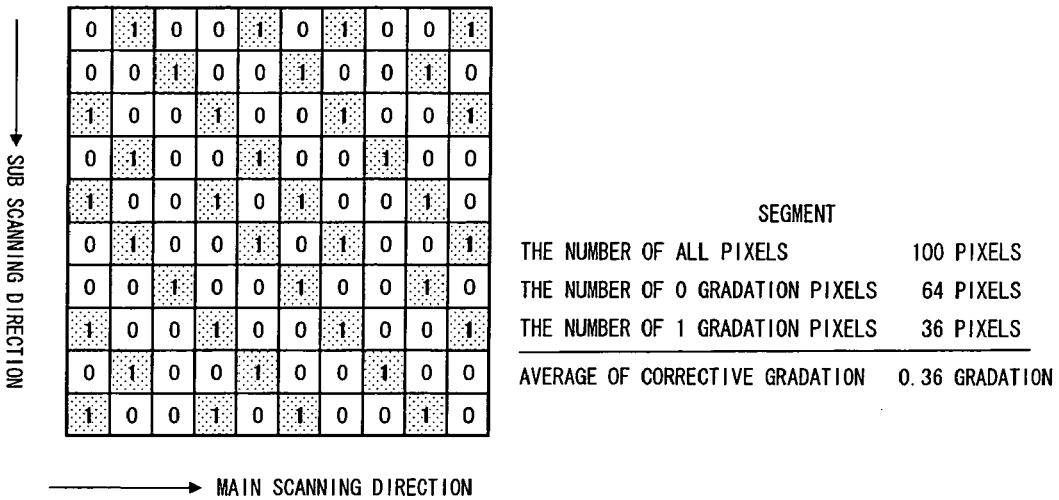
FIG. 20 is a figure showing the first example of the corrective pixel and gradation information.

FIG. 20 is a diagram showing the first example of the corrective pixel & gradation information determined by corrective image processing unit 15.

The example shown in FIG. 20 is an example of the corrective pixel & gradation information determined by corrective image processing unit 15 that conducts image processing employing an error diffusion method (two-directional error diffusion method) as the area coverage modulation method.

The respective grid in the corrective pixel & gradation information in FIG. 20 represents one pixel, and the numerical value in its grid represents the corrective gradation of each pixel. In this example, the segments, in other words, the region of the unit pixel group in the area coverage modulation method is a region equivalent to "10 pixels in the main scanning direction×10 pixels in the sub scanning direction=100 pixels". Also, the average corrective gradation level (average value of the corrective gradation of each pixel) is 0.36. This average corrective gradation is, as above-motioned, the value {Ia or (Ia+Iki)} corresponding to the difference between the exposure property showing the correspondence between the average exposure amount in all the segments and the electric potential after exposure (g01 in FIG. 8) and the reference property common between all the segments (g0 in FIG. 8). This also applies to the examples shown FIG. 21 to FIG. 23 and FIG. 24 (*b*) described in below.

Control member 10 corrects the pixel gradation determined by image processing unit 12 based on the image data, according to the corrective pixel & gradation information determined in the above-mentioned manner (one example of pixel gradation collective means). Concretely, the above correction is conducted by adding the corrective gradation of each pixel in the corrective pixel & gradation information to the corresponding pixel gradation.

Hence, also when the original pixel gradation of the all the pixels in the segments are 0 gradation level, control member 10 conducts the correction (offset) of the pixel gradation based on the corrective pixel & gradation information.

As a result, to each segment, the average exposure amount in the whole segments is corrected (added) only for the exposure amount equivalent to the average corrective gradation, and the property of the eclectic potential after exposure corresponding to the average pixel gradation per segment overall approaches to or approximately conforms (matches) with the reference property g0 {refer to FIG. 18 (*a*), FIG. 19 (*a*)}.

Also, by the segment which is a region of a plurality of pixels, by dispersing the target pixels for correction (pixels having gradation level 1 shown in FIG. 20) by the image process employing the area coverage modulation method and conducting the correction of the pixel gradation (the offset of exposure amount), as the exposure amount adjustment over the entire segments, the resolution dramatically increases corresponding to the number of pixel comprising the segment even if the resolution of the exposure amount adjustment per pixel is low. In the example shown in FIG. 20, if the resolution of the pixel gradation per pixel is 16, the resolution per segment is 10×(16−1)+1=1501 (gradation levels). From this, it is capable of the exposure amount adjustment in high accuracy over the entire segments.

Especially, when image processing unit 12 conducts gradation representation employing area coverage modulation method (so-called, "the digital image processing means") based on image data, the small uneven sensitivity and electrification are inhibited to appear as uneven density in the image, and also it is suitable to inhibit the uneven electrification from appearing as uneven density in an image by controlling the exposure amount employing the area coverage modulation method on a per-segment even if the relatively large uneven electrification exist in the space period.

Figure 21:
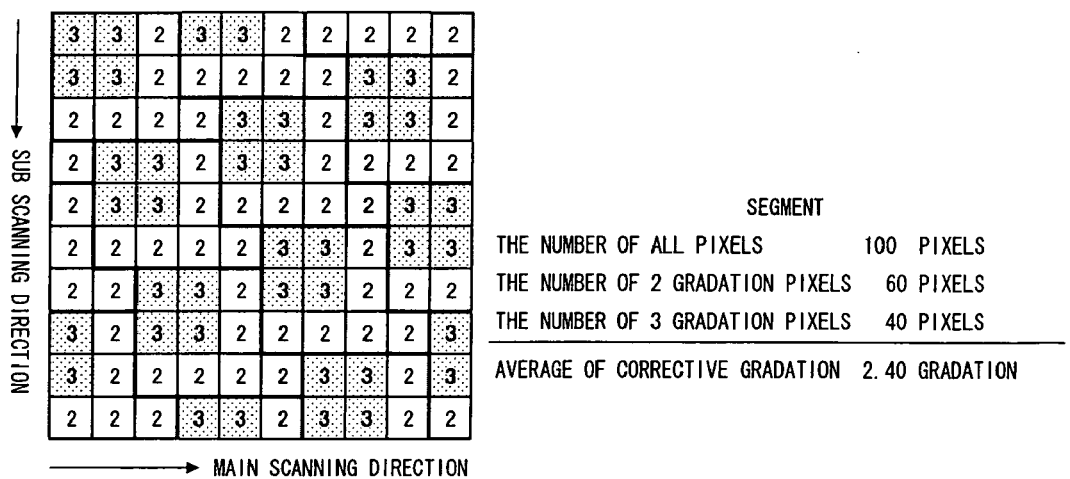
FIG. 21 is a figure showing the second example of the corrective pixel and gradation information.

FIG. 21 is a diagram showing the second example of the corrective pixel & gradation information determined by corrective image processing unit 15.

The example shown in FIG. 21 is an example of the corrective pixel & gradation information determined by corrective image processing unit 15 conducting the image processing employing the screen method as the area coverage modulation method.

In this example, the segment is also the region equivalent to 100 pixels, and also the average corrective gradation level is 2.40.

The correction method of the pixel gradation based in the corrective pixel and gradation information determined in the above manner is the same as the method described in FIG. 20. This also applies to the examples shown in FIG. 22 to FIG. 24.

As described above, even if the screen method is employed as the area coverage modulation method, the same functional effect can be obtained.

Figure 22:
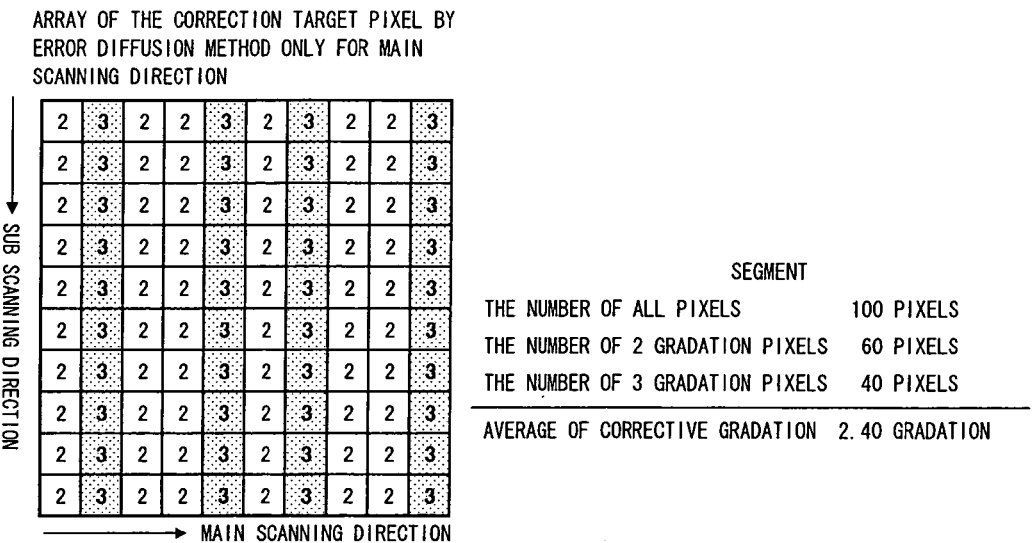
FIG. 22 is a figure showing the third example of the corrective pixel and gradation information.

FIG. 22 is a diagram showing the third example of the corrective pixel & gradation information determined by corrective image processing unit 15.

The example shown in FIG. 22 is an example of the corrective pixel & gradation information determined by corrective image processing unit 15 when an error diffusion method diffusing the corrective gradation only in the main scanning direction (the axial direction on the photoreceptor drum 1) is employed as the area coverage modulation method.

Figure 23:
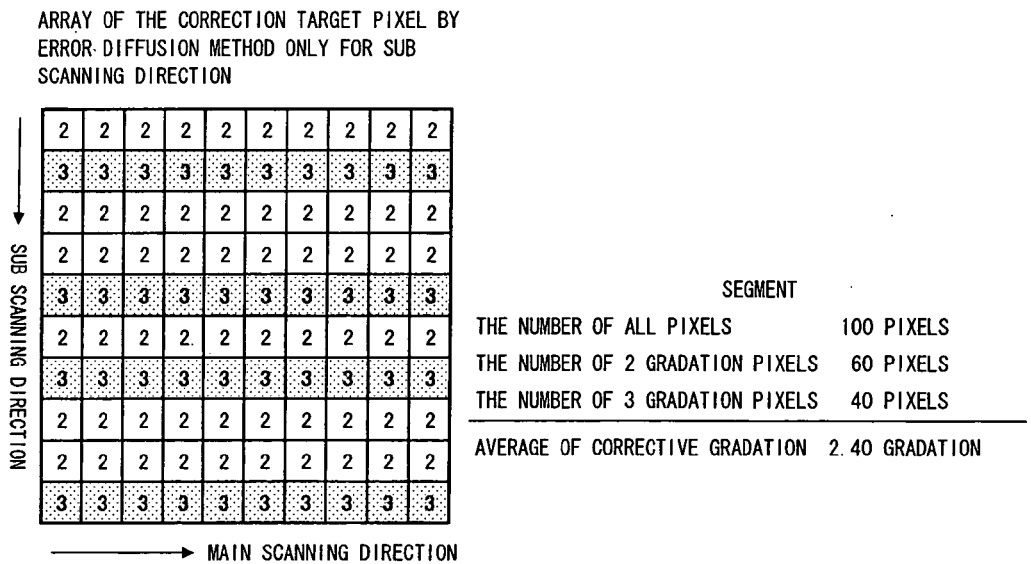
FIG. 23 is a figure showing the fourth example of the corrective pixel and gradation information.

Also, FIG. 23 is a diagram showing the fourth example of the corrective pixel & gradation information determined by corrective image processing unit 15.

The example shown in FIG. 23 is an example of the corrective pixel & gradation information determined by corrective image processing unit 15 when an error diffusion method diffusing the corrective gradation only in the sub scanning direction (the circumferential direction on the photoreceptor drum 1) is employed as the area coverage modulation method.

In these examples showing FIG. 22 and FIG. 23, the segment is also the region equivalent to 100 pixels, and also the average corrective gradation level is 2.40.

As described above, even if the one-dimensional error diffusion method is employed as the area coverage modulation method, the same functional effect can be obtained.

FIGS. 24 (a) and (b) are diagrams respectively showing the array of the pixel gradation based on the image data determined by image processing unit 12 and the fifth example of the corrective pixel & gradation information.

The example shown in FIG. 24(a) is an example of the array having pixel gradation determined by image processing unit 12 when the screen method is employed as the area coverage modulation method employed for the image processing based on the image data.

The unit pixel group is 10 pixels×10 pixels.

The example shown in FIG. 24(b) is an example of the corrective pixel & gradation information determined by corrective image processing unit 15 when the screen method is employed as the area coverage modulation method employed for the image processing based on the differential information.

In this example, the segment is also the region equivalent to 100 pixels, and also the average corrective gradation level is 2.40.

Here, the thick dot line indicated in FIGS. 24(a) and (b) shows the direction of the screen angle in the image processing of each screen method. As shown in FIG. 24, the area coverage modulation method employed for the determination of the corrective pixel and gradation information by corrective image processing unit 15 and the area coverage modulation method employed for the determination of the pixel gradation by image processing unit 12 are the screen methods having the reciprocally shifted screen angle.

If the shift of these screen angles is equal to or more than fifteen degree, the moire caused by the reciprocal interference by each gradation can be prevented when the pixel gradation is added (superimpose) to the corrective gradation. Also, FIG. 24 shows the example of the case where each screen angle is reciprocally shifted approximately 37 degree, Also, if the numbers of pixels in the vertical direction and horizontal direction are identical, between the segments which is a processing unit of the area coverage modulation method employed for the determination of the corrective pixel & gradation information by corrective image processing unit 15, and the unit pixel group which is a processing unit of the area coverage modulation method employed for the determination of the pixel gradation by image processing unit 12, the space periods of the array of the gradation determined by said respective area coverage modulation methods become identical. The above can also prevent the occurrence of moire.

Figure 17:
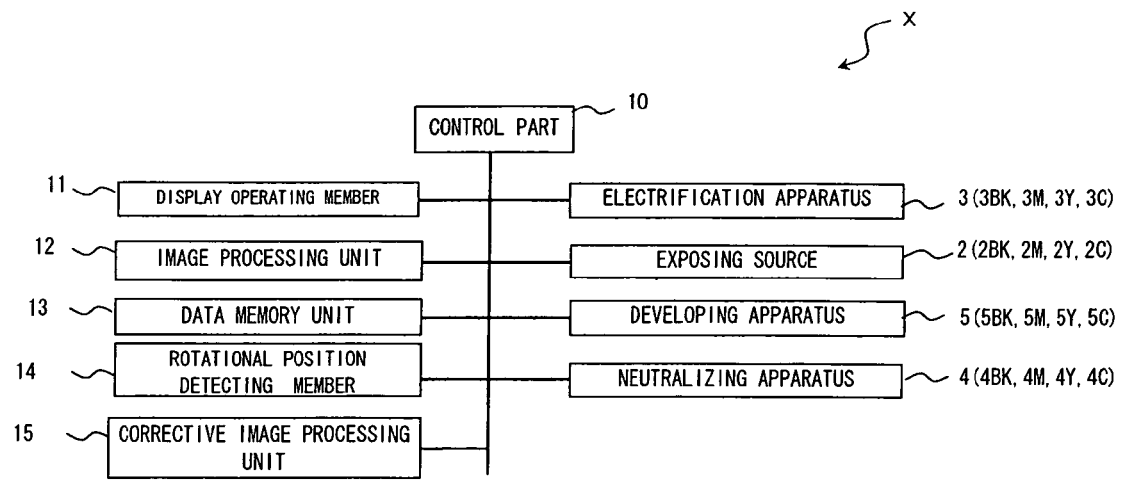
FIG. 17 is a block diagram showing the second example of a schematic structure of the main part of an image forming apparatus X.

In the embodiment showing the image forming apparatus X having the construction indicated in FIG. 17, the example that the differential information related to the difference between the average exposure property in all the segments and the common reference property is previously memorized in data memory unit 13 per segment, and then the corrective pixel & gradation information is determined per segment based on said differential information, has been indicated.

However, not limited to the above, for example, the construction that previously obtained corrective pixel & gradation information is memorized in data memory unit 13 per segment (an example of corrective pixel & gradation information), and then, according to its memorized information, the pixel gradation of each pixel in the respective segments is corrected by control member 10 (an example of pixel gradation correction means), can be applied to this invention. According to the above construction, although the necessary capacity of data memory unit 13 increases, corresponding to that the process of corrective image processing unit 15 would not be required, as a result, the operational load can be reduced, and the construction can be simplified.

Also, the segment in defined as a segment that multi-divided the surface of photoreceptor drum 1 both in axial direction and circumferential direction, though not intending to limit the scope of this invention.

For example, when uneven electrification and uneven sensitivity in one of axial direction or circumferential direction of photoreceptor drum 1 is primarily concerned, the segment may be defined as a segment that multi-divided the surface of photoreceptor drum 1 only in axial direction (the segment dividing photoreceptor drum 1 in cross-sectional manner), or segment that multi-divided the surface of photoreceptor drum 1 only in circumferential direction.

Additionally, in the embodiments and examples, though offset gradation Ia and slope information k1 are indicated as examples of the differential information, not limited to the scope, other information relating to the difference between, exposure property per segment representing the correspondence between the average exposure amount in all the segments and the electric potential after exposure, and the reference property common between all the segments, can be applied.

For example, it is contemplated that, instead of offset gradation Ia, the difference itself of the initial electric potentials of the respective segments corresponding to the reference initial electric potential is memorized, then, at image processing, said difference of the initial electric potential is converted into offset gradation Ia.

Also, instead of slope information k1, such as the coordinate information specifying the slope of coordinate system comprising the axis of the pixel gradation and of the corrected pixel gradation, can be memorized in data memory unit 13.

What is claimed is:

1. An image forming apparatus, comprising an image processing means for determining a pixel gradation indicating gray level in each pixel based upon a prescribed image data, and an exposing means for writing an electrostatic latent image onto a photo receptor with an exposure amount corresponding to said pixel gradation determined by said image processing means by exposing each pixel on a surface of said photo receptor previously electrified by an electrification means, said image forming apparatus further comprising:

an individual differential information memory means for individually memorizing for each segment multi-divided a surface of said photo receptor said differential information that corresponds to the difference between an initial electric potential of said segment and an reference initial electric potential common between all of said segments; and an exposure amount control means for controlling said exposure means to expose each of said segments with an exposure amount added with only an exposure amount corresponding to said differential information when said pixel gradation is within a prescribed range including 0 gradation level comparing an exposure amount obtained by approximately linear-transforming said pixel gradation determined by said image processing means into a exposure amount, and wherein controlling said exposure means for conducting the exposure equivalent to the exposure amount obtained by the approximate linear transformation of the pixel gradation into the exposure amount and the exposure equivalent to the exposure amount of additional exposure on the basis of the differential information can be conducted to each pixel at different separated time zone, and the exposure equivalent to the exposure amount added (offset) corresponding to the differential information can be conducted at the multiple-separated in each pixel.

2. An image forming apparatus according to claim 1, where said exposure amount control means conducts an exposure equivalent to an exposure amount added corresponding to said differential information at multi-separated positions at intervals of approximate two-third or less of an exposure-beam diameter of said exposure means at least in relation to the pixel where said pixel gradation level is 0.

3. An image forming apparatus according to claim 1, where said exposure amount control means conducts an exposure equivalent to an exposure amount added corresponding to said differential information at multi-separated positions surrounding an exposure position equivalent to an exposure amount obtained by at least approximately linear-transforming said pixel gradation into an exposure amount in relation to the pixel where said pixel gradation level is 1 or more.

4. An image forming apparatus, comprising an image processing means for determining a pixel gradation indicating gray level in each pixel based upon a prescribed image data, and an exposing means for writing an electrostatic latent image onto a photoreceptor with an exposure amount corresponding to said pixel gradation determined by said image processing means by exposing each pixel on a surface of said photoreceptor previously electrified by an electrification means, said image forming apparatus further comprising;

an individual differential information memory means for individually memorizing for each segment multi-divided a surface of said photoreceptor said differential information that corresponds to the difference between an initial electric potential of said segment and an reference initial electric potential common between all of said segments; and an exposure amount control means for controlling said exposure means to expose each of said segments with an exposure amount added with only an exposure amount corresponding to said differential information when said pixel gradation is within a prescribed range including 0 gradation level comparing an exposure amount obtained by approximately linear-transforming said pixel gradation determined by said image processing means into a exposure amount;

wherein said exposure amount control means comprises an exposure time control means for adjusting an exposure amount of each pixel by adjusting an exposure time of each pixel by said exposure means corresponding to said differential information;

wherein said exposure means exposes in each pixel during the time from when a prescribed exposure start instructions is generated till a periodic signal continuously generated at the prescribed frequency is generated for a specified count, and said exposure time control means specifies a value corresponding to said pixel gradation as a value of said count to said exposure means, as well as by adjusting the exposure time in each pixel specifying a value corresponding to the pixel gradation to the exposure means as the count, and by adjusting the time from when said exposure start instructions is generated till the first periodic signal is generated according to said differential information.

5. An image forming apparatus, comprising an image processing means for determining a pixel gradation indicating gray level in each pixel based upon a prescribed image data, and an exposing means for writing an electrostatic latent image onto a photoreceptor with an exposure amount corresponding to said pixel gradation determined by said image processing means by exposing each pixel on a surface of said photoreceptor previously electrified by an electrification means, said image forming apparatus further comprising;

an individual differential information memory means for individually memorizing for each segment multi-divided a surface of said photoreceptor said differential information that corresponds to the difference between an initial electric potential of said segment and an reference initial electric potential common between all of said segments; and an exposure amount control means for controlling said exposure means to expose each of said segments with an exposure amount added with only an exposure amount corresponding to said differential information when said pixel gradation is within a prescribed range including 0 gradation level comparing an exposure amount obtained by approximately linear-transforming said pixel gradation determined by said image processing means into a exposure amount;

wherein said exposure amount control means comprises an exposure time control means for adjusting an exposure amount of each pixel by adjusting an exposure time of each pixel by said exposure means corresponding to said differential information;

wherein said exposure means exposes in each pixel during the time from when a prescribed exposure start instructions is generated till a periodic signal continuously generated at a prescribed frequency is generated for a specified count, and said exposure time control means adjusts an exposure time of each pixel by specifying a total value of a value corresponding to said pixel gradation and a value corresponding to said differential information as said count to said exposure means.

6. An image forming apparatus, comprising an image processing means for determining a pixel gradation indicating gray level in each pixel based upon a prescribed image data, and an exposing means for writing an electrostatic latent image onto a photoreceptor with an exposure amount corresponding to said pixel gradation determined by said image processing means by exposing each pixel on a surface of said photoreceptor previously electrified by an electrification means, said image forming apparatus further comprising;

an individual differential information memory means for individually memorizing for each segment multi-divided a surface of said photoreceptor said differential information that corresponds to the difference between an initial electric potential of said segment and an reference initial electric potential common between all of said segments; and an exposure amount control means for controlling said exposure means to expose each of said segments with an exposure amount added with only an exposure amount corresponding to said differential information when said pixel gradation is within a prescribed range including 0 gradation level comparing an exposure amount obtained by approximately linear-transforming said pixel gradation determined by said image processing means into a exposure amount;

wherein said exposure amount control means comprises an exposure time control means for adjusting an exposure amount of each pixel by adjusting an exposure time of each pixel by said exposure means corresponding to said differential information;

wherein said exposure means exposes in each pixel during the time from when prescribed exposure start instructions is generated till a prescribed exposure terminating instructions is generated, and said exposure time control means adjusts a exposure time of each pixel by adjusting the time from a generation of exposure start instruction to a generation of said exposure terminating instruction.

7. An image forming apparatus, comprising an image processing means for determining a pixel gradation indicating gray level in each pixel based upon a prescribed image data, and an exposing means for writing an electrostatic latent image onto a photoreceptor with an exposure amount corresponding to said pixel gradation determined by said image processing means by exposing each pixel on a surface of said photoreceptor previously electrified by an electrification means, said image forming apparatus further comprising;

an individual differential information memory means for individually memorizing for each segment multi-divided a surface of said photoreceptor said differential information that corresponds to the difference between an initial electric potential of said segment and an reference initial electric potential common between all of said segments;

an exposure amount control means for controlling said exposure means to expose each of said segments with an exposure amount added with only an exposure amount corresponding to said differential information when said pixel gradation is within a prescribed range including 0 gradation level comparing an exposure amount obtained by approximately linear-transforming said pixel gradation determined by said image processing means into a exposure amount;

said exposure amount control means comprising an exposure time control means for adjusting an exposure amount of each pixel by adjusting an exposure time of each pixel by said exposure means corresponding to said differential information; and an individual slope information memory means for memorizing a slope information which defines a slop of when said pixel gradation is approximately linear-transformed into said exposure amount for each of said segments, wherein said exposure amount control means comprises an exposure intensity adjustment means adjusting an exposure intensity by said exposure means corresponding to changes of an exposure amount based upon said slope information for each of said segments.

8. An image forming apparatus, comprising an image processing means for determining a pixel gradation indicating gray level in each pixel based upon a prescribed image data, and an exposing means for writing an electrostatic latent image onto a photoreceptor with an exposure amount corresponding to said pixel gradation determined by said image processing means by exposing each pixel on a surface of said photoreceptor previously electrified by an electrification means, said image forming apparatus further comprising;

an individual differential information memory means for individually memorizing for each segment multi-divided a surface of said photoreceptor said differential information that corresponds to the difference between an initial electric potential of said segment and an reference initial electric potential common between all of said segments; and an exposure amount control means for controlling said exposure means to expose each of said segments with an exposure amount added with only an exposure amount corresponding to said differential information when said pixel gradation is within a prescribed range including 0 gradation level comparing an exposure amount obtained by approximately linear-transforming said pixel gradation determined by said image processing means into a exposure amount, and wherein adjusting an exposure time by said exposure means based upon at least said pixel gradation as well as adjusting the exposure intensity of said exposure means based upon said differential information;

wherein said exposure amount control means adjusts an exposure time by said exposure means based on said pixel gradation and said differential information;

wherein said exposure amount control means conducts the exposure amount control based on said differential information by conducting the adjustment of an exposure intensity of said exposure control means within a prescribed allowable range and by adjusting the deficient exposure amount from an exposure intensity control within said allowable range by adjusting an exposure time of said exposure means.

9. An image forming apparatus, comprising an image processing means for determining a pixel gradation indicating gray level in each pixel based upon a prescribed image data, and an exposing means for writing an electrostatic latent image onto a photoreceptor with an exposure amount corresponding to said pixel gradation determined by said image processing means by exposing each pixel on a surface of said photoreceptor previously electrified by an electrification means, said image forming apparatus further comprising;

an individual differential information memory means for individually memorizing for each segment multi-divided a surface of said photoreceptor said differential information that corresponds to the difference between an initial electric potential of said segment and an reference initial electric potential common between all of said segments;

an exposure amount control means for controlling said exposure means to expose each of said segments with an exposure amount added with only an exposure amount corresponding to said differential information when said pixel gradation is within a prescribed range including 0 gradation level comparing an exposure amount obtained by approximately linear-transforming said pixel gradation determined by said image processing means into a exposure amount, and wherein adjusting an exposure time by said exposure means based upon at least said pixel gradation as well as adjusting the exposure intensity of said exposure means based upon said differential information; and an individual slope information memory means for individually memorizing said slope information that defines a slope of when said pixel gradation is approximately linear-transformed into said exposure amount for each of said segments, and wherein said exposure amount control means conducts the adjustment of an exposure intensity by said exposure control based on said slope information of each of said segments.

10. An image forming apparatus, comprising an image processing means for determining a pixel gradation indicating gray level in each pixel based upon a prescribed image data, and an exposing means for writing an electrostatic latent image onto a photoreceptor with an exposure amount corresponding to said pixel gradation determined by said image processing means by exposing each pixel on a surface of said photoreceptor previously electrified by an electrification means, said image forming apparatus further comprising;

an individual differential information memory means for individually memorizing for each segment multi-divided a surface of said photoreceptor said differential information that corresponds to the difference between an initial electric potential of said segment and an reference initial electric potential common between all of said segments; and an exposure amount control means for controlling said exposure means to expose each of said segments with an exposure amount added with only an exposure amount corresponding to said differential information when said pixel gradation is within a prescribed range including 0 gradation level comparing an exposure amount obtained by approximately linear-transforming said pixel gradation determined by said image processing means into a exposure amount;

wherein said
segment is a segment that divides a surface of a dram-shaped photoreceptor into a plurality in an axial direction, in a circumference direction, or in either of said directions.

11. An image forming apparatus, comprising an image processing means for determining a pixel gradation indicating gray level in each pixel based upon a prescribed image data, and an exposing means for writing an electrostatic latent image onto a photoreceptor with an exposure amount corresponding to said pixel gradation determined by said image processing means by exposing each pixel on a surface of said photoreceptor previously electrified by an electrification means, said image forming apparatus further comprising;

an individual differential information memory means for individually memorizing for each segment multi-divided a surface of said photoreceptor said differential information that corresponds to the difference between an initial electric potential of said segment and an reference initial electric potential common between all of said segments; and an exposure amount control means for controlling said exposure means to expose each of said segments with an exposure amount added with only an exposure amount corresponding to said differential information when said pixel gradation is within a prescribed range including 0 gradation level comparing an exposure amount obtained by approximately linear-transforming said pixel gradation determined by said image processing means into a exposure amount;

wherein said image processing means is conducting gradation representation in an area coverage modulation method that determines an arrangement of said pixel gradation in a plurality of pixels based upon said image data.

12. An image forming apparatus, comprising an image processing means for determining a pixel gradation indicating gray level in each pixel based upon a prescribed image data, and an exposing means for writing an electrostatic latent image onto a photoreceptor with an exposure amount corresponding to said pixel gradation determined by said image processing means by exposing each pixel on a surface of said photoreceptor previously electrified by an electrification means, said image forming apparatus further comprising;

an pixel gradation correction means for correcting said pixel gradation determined by said image processing means according to an array of a target pixel for correction previously determined by said image processing in an area coverage modulation method and the corrective pixel & gradation information in relation to a corrective gradation of said pixel gradation in said target pixel for correction for each segment multi-divided a surface of photoreceptor; and an exposure amount control means for controlling said exposure means to conduct an exposure by said pixel gradation correction means with an exposure amount corresponding to said corrected pixel gradation;

wherein
the average value of said corrective gray level in said corrective pixel & gradation information of each of said segments is a value that corresponds to the difference between an exposure property indicating an correspondence between the average exposure amount of all of said segments and an electric potential after exposure amount of all of said segments and an electric potential after exposure and an reference property common between all of said segments, and said pixel gradation correction means corrects said pixel gradation based upon said corrective pixel and & gradation information also when said pixel gradation of all pixels in said segments in the divided segment in 0 gradation level.

13. An image forming apparatus according to claim 12, wherein the average value of said corrective gradation in said corrective pixel & gradation information of each of said segments is a value that corresponds to the difference between an initial electric potential in the average exposure property in a whole of said segments and the initial electric potential in said reference property.

14. An image forming apparatus, comprising an image processing means for determining a pixel gradation indicating gray level in each pixel based upon a prescribed image data, and an exposing means for writing an electrostatic latent image onto a photoreceptor with an exposure amount corresponding to said pixel gradation determined by said image processing means by exposing each pixel on a surface of said photoreceptor previously electrified by an electrification means, said image forming apparatus further comprising;
   an pixel gradation correction means for correcting said pixel gradation determined by said image processing means according to an array of a target pixel for correction previously determined by said image processing in an area coverage modulation method and the corrective pixel & gradation information in relation to a corrective gradation of said pixel gradation in said target pixel for correction for each segment multi-divided a surface of photoreceptor; and
   an exposure amount control means for controlling said exposure means to conduct an exposure by said pixel gradation correction means with an exposure amount corresponding to said corrected pixel gradation;
   wherein the area coverage modulation method employed for the determination of said corrective pixel & gradation information is an error diffusion method or screen method.

15. An image forming apparatus, comprising an image processing means for determining a pixel gradation indicating gray level in each pixel based upon a prescribed image data, and an exposing means for writing an electrostatic latent image onto a photoreceptor with an exposure amount corresponding to said pixel gradation determined by said image processing means by exposing each pixel on a surface of said photoreceptor previously electrified by an electrification means, said image forming apparatus further comprising;
   an pixel gradation correction means for correcting said pixel gradation determined by said image processing means according to an array of a target pixel for correction previously determined by said image processing in an area coverage modulation method and the corrective pixel & gradation information in relation to a corrective gradation of said pixel gradation in said target pixel for correction for each segment multi-divided a surface of photoreceptor; and
   an exposure amount control means for controlling said exposure means to conduct an exposure by said pixel gradation correction means with an exposure amount corresponding to said corrected pixel gradation;
   wherein said image processing means represents a gradation in an area coverage modulation method determining an array of said pixel gradation for each of unit pixel group consisting of a plurality of pixels based upon said image data.

16. An image forming apparatus according to claim 15, where the number of pixels in a in a longitudinal direction (vertical direction) is the same as the number of pixel in a lateral direction between said segments and said unit pixel group.

17. An image forming apparatus according to claim 15, where an area coverage modulation method employed for determination of said corrective pixel & gradation information and an area coverage modulation method employed for determination of said pixel gradation by said image processing means are screen method where each screen angle is reciprocally shifted approximately fifteen degree or more.

18. An image forming apparatus, comprising an image processing means for determining a pixel gradation indicating gray level in each pixel based upon a prescribed image data, and an exposing means for writing an electrostatic latent image onto an $\alpha$-Si photoreceptor with an exposure amount corresponding to said pixel gradation determined by said image processing means by exposing each pixel on a surface of said $\alpha$-Si photoreceptor previously electrified by an electrification means, said image forming apparatus further comprising;
   an individual differential information memory means for individually memorizing for each segment multi-divided a surface of said $\alpha$-Si photoreceptor said differential information that corresponds to the difference between an initial electric potential of said segment and an reference initial electric potential common between all of said segments; and
   an exposure amount control means for controlling said exposure means to expose each of said segments with an exposure amount added with only an exposure amount corresponding to said differential information when said pixel gradation is within a prescribed range including 0 gradation level comparing an exposure amount obtained by approximately linear-transforming said pixel gradation determined by said image processing means into a exposure amount.

* * * * *